US006751684B2

(12) United States Patent
Owen et al.

(10) Patent No.: US 6,751,684 B2
(45) Date of Patent: Jun. 15, 2004

(54) SYSTEM AND METHOD OF ALLOCATING BANDWIDTH TO A PLURALITY OF DEVICES INTERCONNECTED BY A PLURALITY OF POINT-TO-POINT COMMUNICATION LINKS

(76) Inventors: Jonathan M. Owen, 155 School St., Northboro, MA (US) 01532; Mark D. Hummel, 5 Colella Dr., Franklin, MA (US) 02038

( * ) Notice: Subject to any disclaimer, the term of this patent is extended or adjusted under 35 U.S.C. 154(b) by 539 days.

(21) Appl. No.: 09/746,109

(22) Filed: Dec. 21, 2000

(65) Prior Publication Data

US 2002/0083233 A1 Jun. 27, 2002

(51) Int. Cl.[7] .............................................. G06F 3/00
(52) U.S. Cl. .......................... 710/29; 710/33; 710/41; 709/209; 709/233; 709/232; 714/776; 370/231; 370/232; 370/233; 370/285; 370/395.41
(58) Field of Search ........................... 710/29, 33, 41; 709/209, 233, 232; 714/776; 370/231, 232, 233, 285, 395.41

(56) References Cited

U.S. PATENT DOCUMENTS

| | | | | |
|---|---|---|---|---|
| 5,416,771 A | * | 5/1995 | Iwata | 370/410 |
| 5,457,687 A | * | 10/1995 | Newman | 370/232 |
| 5,825,755 A | * | 10/1998 | Thompson et al. | 370/296 |
| 5,968,128 A | * | 10/1999 | Lauck et al. | 709/232 |
| 6,192,397 B1 | * | 2/2001 | Thompson | 709/209 |
| 6,215,793 B1 | * | 4/2001 | Gultekin et al. | 370/465 |
| 6,337,863 B1 | * | 1/2002 | Nair et al. | 370/395.53 |
| 6,438,104 B1 | * | 8/2002 | Fodor et al. | 370/230 |
| 6,501,734 B1 | * | 12/2002 | Yu et al. | 370/236 |

* cited by examiner

*Primary Examiner*—Jeffrey Gaffin
*Assistant Examiner*—Niketa Patel
(74) *Attorney, Agent, or Firm*—LaRiviere, Grubman & Payne, LLP

(57) ABSTRACT

A method is provided for fairly allocating bandwidth to a plurality of devices connected to a communication link implemented as a plurality of point-to-point links. The point-to-point links interconnect the devices in a daisy chain fashion. Each device is configured to transmit locally generated packets and to forward packets received from downstream devices onto one of the point-to-point links. The rate at which each device transmits local packets relative to forwarding received packets is referred to as the device's insertion rate. A fair bandwidth allocation algorithm is implemented in each (upstream) device to determine the highest packet issue rate of the devices which are downstream of that (upstream) device. The packet issue rate of a downstream device is the number of local packets associated with the downstream device that are received at the upstream device relative to the total number of packets received at the upstream device. By monitoring the total flow of packets received at the upstream device, the highest packet issue rate of the respective packet issue rates of the downstream devices may be determined. Each upstream device then matches its insertion rate to the highest packet issue rate of its downstream devices. The determination of the highest packet issue rate may be performed dynamically such that the insertion rate of the upstream device can adapt to changes in communication traffic patterns. Further, the fair bandwidth allocation algorithm may include a priority algorithm to arbitrate between local and received packets transmitted at the insertion rate.

33 Claims, 14 Drawing Sheets

| Bit Time | 7 | 6 | 5 | 4 | 3 | 2 | 1 | 0 |
|---|---|---|---|---|---|---|---|---|
| 0 | SeqID[3:2] | | CMD[5:0] | | | | | |
| 1 | Pass PW | SeqID[1:0] | | UnitID[4:0] | | | | |
| 2 | | | | SrcTag[4:0] | | | | |
| 3 | Addr[7:2] | | | | | | | |
| 4 | Addr[15:8] | | | | | | | |
| 5 | Addr[23:16] | | | | | | | |
| 6 | Addr[31:24] | | | | | | | |
| 7 | Addr[39:32] | | | | | | | |

| Bit Time | 7 | 6 | 5 | 4 | 3 | 2 | 1 | 0 |
|---|---|---|---|---|---|---|---|---|
| 0 | | | CMD[5:0] | | | | | |
| 1 | Pass PW | Bridge | | | UnitID[4:0] | | | |
| 2 | | | | SrcTag[4:0] | | | | |
| 3 | | | | | | | | |

| Bit Time | 7 | 6 | 5 | 4 | 3 | 2 | 1 | 0 |
|---|---|---|---|---|---|---|---|---|
| 0 | | | CMD[5:0] | | | | | |
| 1 | | | | | | | | |
| 2 | | | | | | | | |
| 3 | | | | | | | | |

FIG. 7

| Bit Time | 7 | 6 | 5 | 4 | 3 | 2 | 1 | 0 |
|---|---|---|---|---|---|---|---|---|
| 0 | Data[7:0] | | | | | | | |
| 1 | Data[15:8] | | | | | | | |
| 2 | Data[23:16] | | | | | | | |
| 3 | Data[31:24] | | | | | | | |
| 4 | Data[39:32] | | | | | | | |
| 5 | Data[47:40] | | | | | | | |
| 6 | Data[55:48] | | | | | | | |
| 7 | Data[63:56] | | | | | | | |

FIG. 6

SYSTEM AND METHOD OF ALLOCATING BANDWIDTH TO A PLURALITY OF DEVICES INTERCONNECTED BY A PLURALITY OF POINT-TO-POINT COMMUNICATION LINKS

BACKGROUND OF THE INVENTION

1. Field of the Invention

The present invention relates generally to the allocation of communication bandwidth to a plurality of devices coupled to a communication medium and, more particularly, to a fair bandwidth allocation scheme applicable to devices interconnected in daisy-chain fashion via a plurality of point-to-point communication links.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Many computer systems generally have been designed around a shared bus architecture, in which one or more host processors and a host memory are coupled to a shared host bus. Transactions between processors and accesses to memory all occur on the shared bus. Such computer systems typically include an input/output (I/O) subsystem which is coupled to the shared host bus via an I/O bridge which manages information transfer between the I/O subsystem and the devices coupled to the shared host bus. Many I/O subsystems also generally follow a shared bus architecture, in which a plurality of I/O or peripheral devices are coupled to a shared I/O bus. The I/O subsystem may include several branches of shared I/O buses interconnected via additional I/O bridges.

Such shared bus architectures have several advantages. For example, because the bus is shared, each of the devices coupled to the shared bus is aware of all transactions occurring on the bus. Thus, transaction ordering and memory coherency is easily managed. Further, arbitration among devices requesting access to the shared bus can be simply managed by a central arbiter coupled to the bus. For example, the central arbiter may implement an allocation algorithm to ensure that each device is fairly allocated bus bandwidth according to a predetermined priority scheme. Such a priority algorithm may be a "round-robin" algorithm that provides equal bandwidth to each of the devices requesting access to the shared bus.

Shared buses, however, also have several disadvantages. For example, the multiple attach points of the devices coupled to the shared bus produce signal reflections at high signal frequencies which reduce signal integrity. As a result, signal frequencies on the bus are generally kept relatively low to maintain signal integrity at an acceptable level. The relatively low signal frequencies reduce signal bandwidth, limiting the performance of devices attached to the bus. Further, the multiple devices attached to the shared bus present a relatively large electrical capacitance to devices driving signals on the bus, thus limiting the speed of the bus. The speed of the bus also is limited by the length of the bus, the amount of branching on the bus, and the need to allow turnaround cycles on the bus. Accordingly, attaining very high bus speeds (e.g., 500 MHz and greater) is difficult in more complex shared bus systems.

The problems associated with the speed performance of a shared bus system may be addressed by implementing the bus as a packet-based bidirectional communication link comprising a plurality of sets of unidirectional point-to-point links. Each set of unidirectional links interconnects two devices such that multiple devices can be connected in daisy-chain fashion. In such an I/O subsystem, a daisy chain of I/O devices can be connected to the host subsystem through a host bridge. The host bridge is connected to the first device in the daisy chain via a set of unidirectional links. The first device functions as a forwarding device (i.e., a repeater) to relay packets received from the host bridge to the next device, and so on down the chain of devices. Similarly, each device can forward packets received from other devices up the chain to the host bridge. In addition to forwarding packets, each device also can issue its own packets into the stream of forwarded packets.

Although the daisy-chain architecture addresses the speed issues associated with a shared bus, special care should be taken in implementing the bus as a series of point-to-point links to ensure that features available in shared bus architectures also are available in the daisy-chain architecture. For example, in a shared bus system, only one device at a time can drive communication packets onto the bus. Thus, transaction ordering is controlled by the order in which the device issuing the packet gains access to the bus. In the shared bus system, all devices can view all transactions on the bus, and thus the devices can be configured to agree upon ordering. In the daisy-chain configuration, however, transactions directed from a first device to a second device cannot be viewed by any other device that is not positioned between the first and second devices in the chain. Accordingly, a transaction management and control scheme should be provided to ensure the appropriate ordering of transactions in the daisy-chained I/O subsystem. For example, to ensure ordering in a daisy-chain system, direct peer-to-peer communications may be prohibited. Instead, all packets may be forced to travel through a common entity (e.g., a host bridge at one end of the chain), which assumes control of ordering issues.

In addition to ordering issues, the daisy-chain architecture offers challenges in ensuring fair allocation of bus bandwidth to the devices connected to the daisy chain. As discussed above, in the shared bus system, bandwidth typically is allocated by a central arbiter coupled to the shared bus. The central arbiter implements an allocation algorithm that balances available bandwidth among devices which are currently requesting access to the bus. In the daisy-chain environment, however, it is not possible to provide a central arbiter and, thus, bus arbitration is distributed among all the devices connected in the chain. Further, if the ordering scheme dictates that all packets should be routed through a bridge device, then devices both forward packets received from other devices and insert locally generated packets onto one of the point-to-point links in a direction toward the bridge device. In a system implementing such an ordering scheme, the allocation of bandwidth must take into account the number of local packets a particular device may insert relative to the number of received packets the device forwards. The ratio of inserted packets to forwarded packets is referred to as the "insertion rate" of a particular device. Because the devices are connected in a daisy chain, the ratio of local packets to forwarded packets at any one device may vary considerably depending on the device's position in the chain.

In the daisy-chain environment, each device sees a transmit bandwidth determined by flow control from the next device in the chain. However, each device is left to independently determine its own insertion rate within its transmit bandwidth. That is, each device independently allocates its transmit bandwidth between received packets the device is forwarding and locally generated packets the device is inserting in a stream of packets on a particular point-to-point link. If each device is allowed to insert packets at will, such an allocation scheme ultimately leads to marked and unpredictable imbalances in bandwidth allocation among the devices, as well as potential stalls of requests issued by devices. The imbalances can be particularly pronounced in systems having a large number of daisy-chained devices.

The problems of the distributed allocation scheme may be addressed by implementing a static insertion rate allocation scheme. That is, each device may be assigned a fixed insertion rate based on preconceived assumptions about device communication patterns. However, such an a priori allocation scheme also may result in non-optimal usage of bandwidth, because the static rate allocation does not allow the devices to adapt to changes in communication patterns.

Accordingly, it would be desirable to provide a bandwidth allocation scheme that results in a fair, or balanced, allocation of bandwidth to the I/O devices connected in a daisy chain. It would further be desirable if such an allocation scheme could dynamically adapt to changes in communication traffic patterns to ensure a more optimal usage of available bandwidth.

The present invention may be directed to one or more of the problems set forth above.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present invention, there is provided a method of allocating bandwidth to a plurality of devices transmitting packets on a communication link implemented as a plurality of point-to-point links. The method comprises the act of determining, at a first device of the plurality of devices, a packet issue rate of a second device connected to the communication link. The packet issue rate corresponds to a number of second local packets generated by the second device and received by the first device on a first point-to-point link relative to a total number of received packets received by the first device on the first point-to-point link, wherein the received packets include the second local packets. The method also comprises the act of matching an insertion rate of the first device to the packet issue rate, wherein the insertion rate corresponds to insertion of first local packets generated by the first device relative to forwarding of the received packets onto a second point-to-point link.

In one embodiment of the invention, each of the plurality of devices is configured to determine the highest packet issue rate of any of the devices which are downstream of that particular device. Each of the plurality of devices matches its insertion rate to the highest packet issue rate determined by that device.

In accordance with another aspect of the present invention, there is provided a method of allocating bandwidth to a plurality of devices transmitting packets on a communication link implemented as a plurality of point-to-point links. The method comprises monitoring a flow of packet at a first device of the plurality of devices, and associating each of the packets in the monitored flow with a respective device of the plurality of devices. Each of the plurality of devices is configured to transmit, onto one of the point-to-point links, local packets associated with that device and received packets associated with other devices onto one of the point-to-point links. Each device has a respective packet issue rate which corresponds to the number of local packets associated with that device relative to the total number of received packets in the monitored flow of packets received at the first device. The method also comprises determining a highest packet issue rate of the respective packet issue rates.

In accordance with still another aspect of the present invention, there is provided a device configured to transmit packets onto a communication link implemented as a plurality of point-to-point links. The device comprises a first interface to receive packets from a first point-to-point link which are transmitted by at least one other device connected to the communication link. The device also comprises a second interface to transmit packets onto a second point-to-point link, the transmitted packets comprising local packets generated by the device and received packets forwarded by the device. The device also includes allocation logic coupled to the first interface and the second interface. Allocation logic is operably coupled to the first and second interfaces and is configured to monitor a flow of packets received from the first point-to-point link, and to determine, based on the monitored flow, a device insertion rate for transmitting local packets relative to forwarding received packets onto the second point-to-point link.

BRIEF DESCRIPTION OF THE DRAWINGS

The foregoing and other advantages of the invention will become apparent upon reading the following detailed description and upon reference to the drawings in which:

FIG. 4 illustrates an exemplary format of a request packet employed in the I/O subsystem shown in FIG. 2;

FIG. 5 illustrates an exemplary format of a response packet employed in the I/O subsystem shown in FIG. 2;

FIG. 6 illustrates an exemplary format of a data packet employed in the I/O subsystem shown in FIG. 2;

FIG. 7 illustrates an exemplary format of an information packet employed in the I/O subsystem shown in FIG. 2;

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
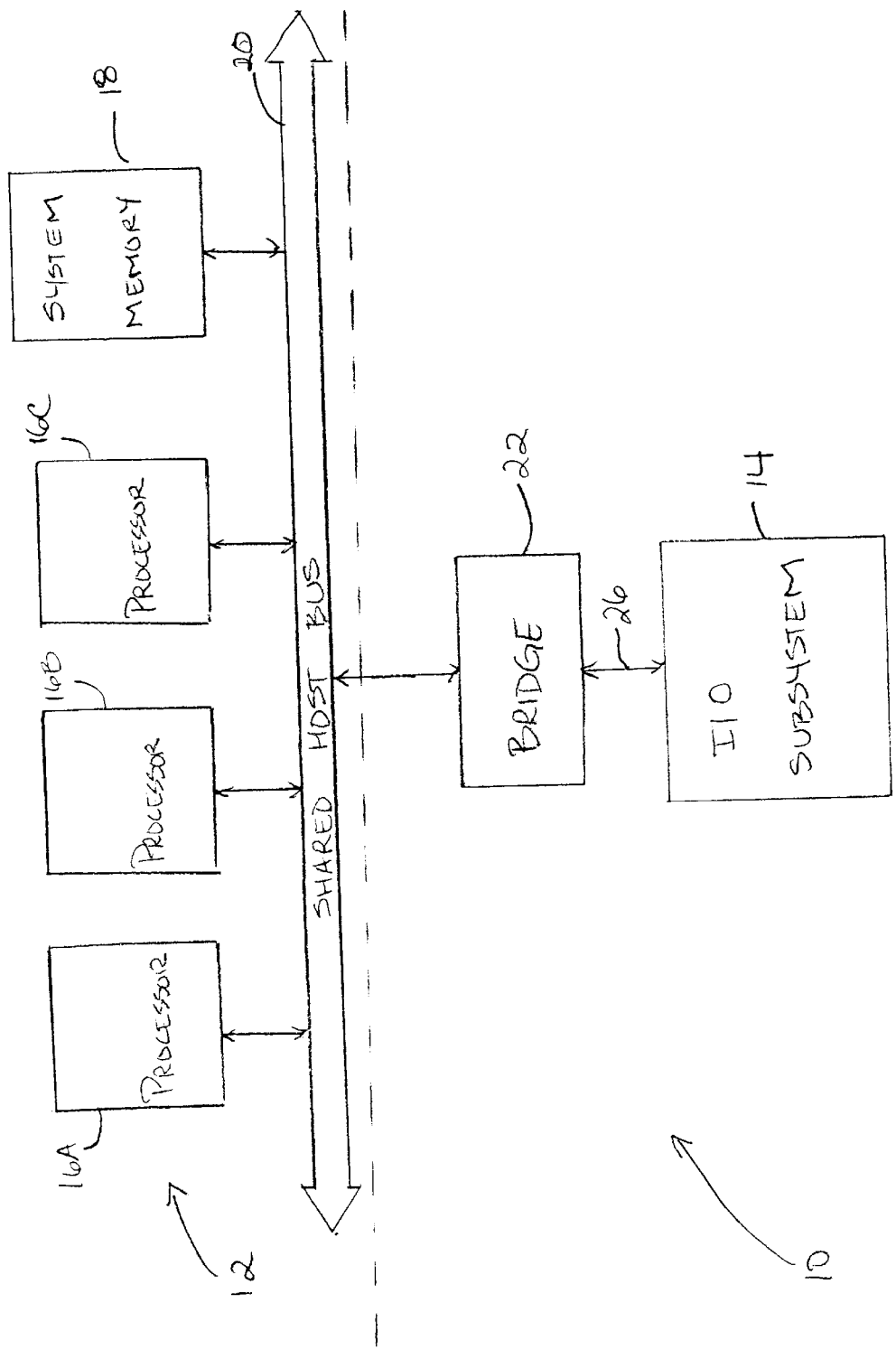
FIG. 1 shows a computing system including a processing subsystem interconnected to an subsystem implemented in accordance with the present invention.
Figure 2:
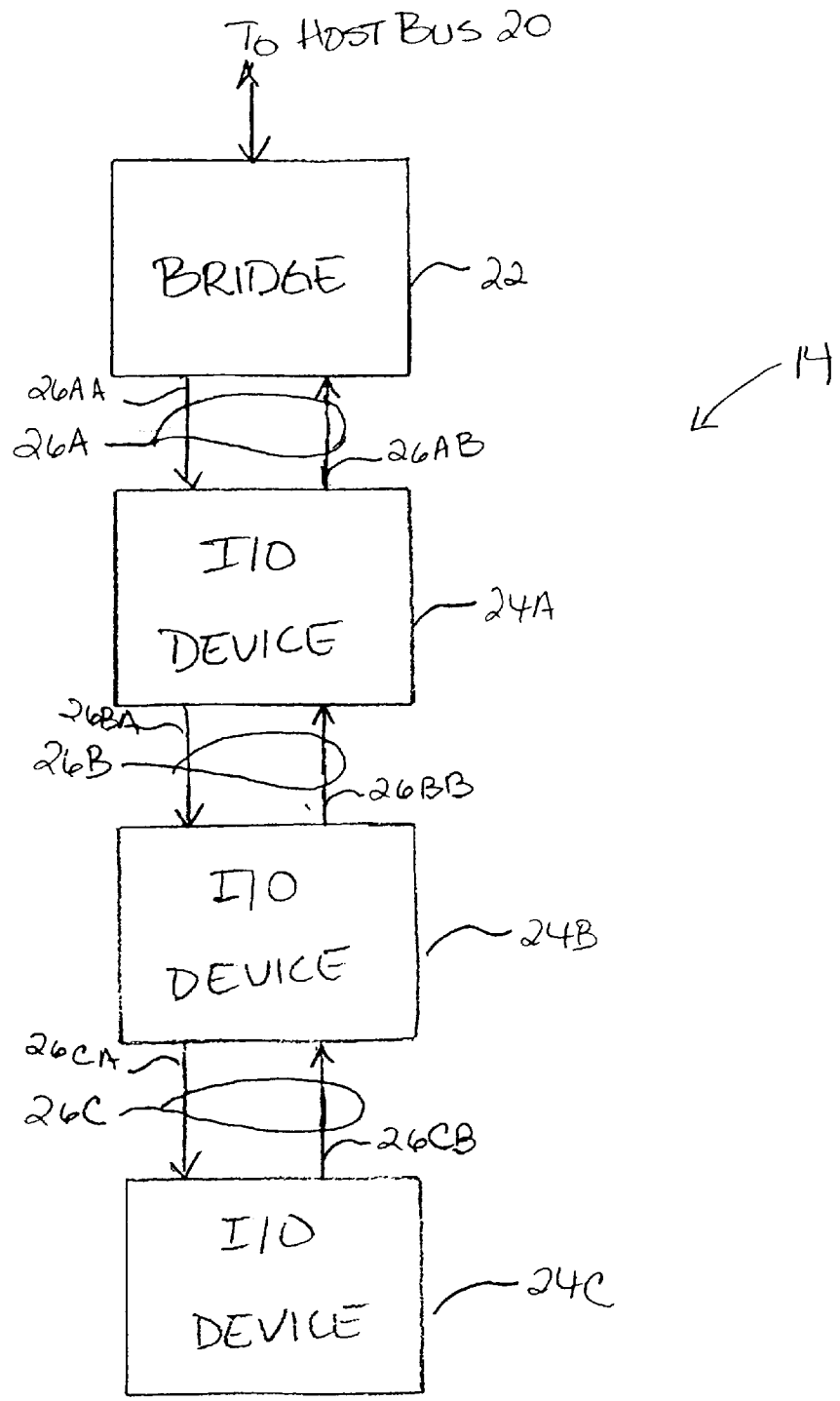
FIG. 2 shows an exemplary embodiment of the I/O subsystem of FIG. 1.

Turning now to the drawings, FIGS. 1 and 2 illustrate a computing system 10 implemented in accordance with the invention. The computing system 10 includes a processing subsystem 12 and an input/output (I/O) subsystem 14. In the embodiment illustrated in FIG. 1, the processing subsystem 12 has a shared bus architecture, in which one or more processing devices 16A, 16B, and 16C (e.g., processors, microprocessors, etc.) and a system memory 18 are coupled to a shared host bus 20. It should be understood, however, that the invention also contemplates a processing subsystem 12 that is implemented as a distributed processing system in which the system memory space is distributed among the various processing devices. In such a configuration, each processing device includes a memory controller to control access to the memory space associated with the particular processing device. Further, in such a distributed system, the host bus may be implemented as a plurality of bi-directional communication links comprising sets of unidirectional point-to-point links interconnecting the various processing devices.

Regardless of the specific architecture of the processing subsystem 12, the processing subsystem 12 is coupled to the I/O subsystem 14 via a host bridge 22, which manages communications between the processing system 12 and the I/O subsystem 14. On one side, the host bridge 22 is connected to the host bus 20. On the other side, as shown in FIG. 2, the host bridge 22 is connected to a daisy chain of I/O devices 24A, 24B, and 24C. The I/O devices 24A, 24B, and 24C are interconnected by a bi-directional communication link implemented as a plurality of bi-directional point-to-point communication links 26A, 26B, and 26C. Each I/O device 24A, 24B, and 24C may embody one or more I/O functions (e.g., modem, sound card, etc.). It should be understood that, although only three I/O devices are illustrated, more or fewer I/O devices may be interconnected in the daisy chain. For example, in one embodiment, up to thirty-one separate I/O devices or I/O functions may be connected in a chain.

Figure 3:
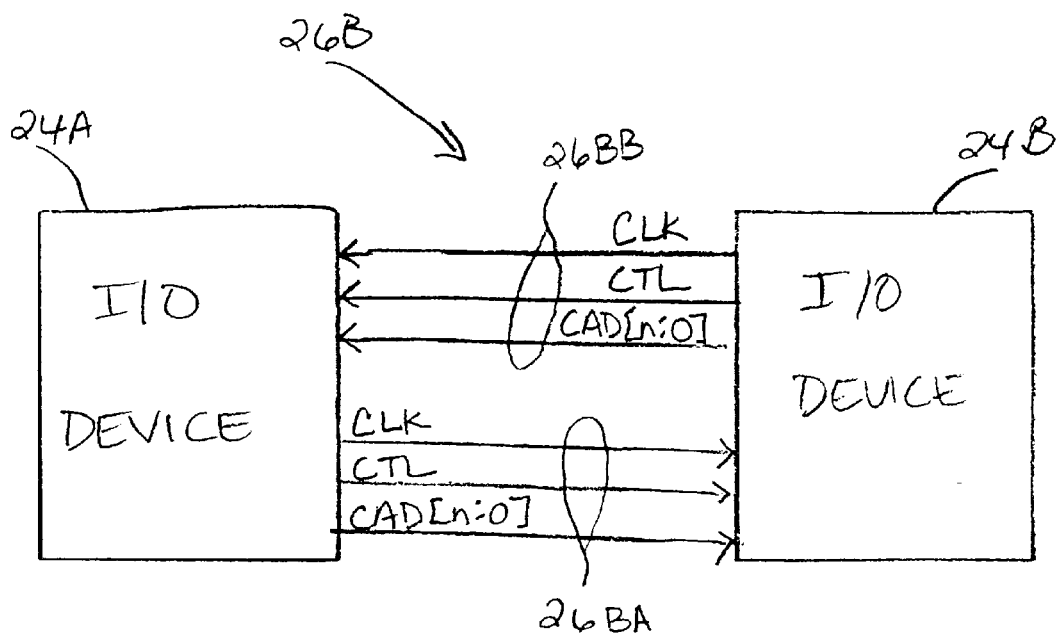
FIG. 3 illustrates an exemplary embodiment of a bi-directional communication link interconnecting two I/O devices in the I/O subsystem of FIG. 2.

In an exemplary embodiment, and as illustrated in FIG. 3, each bi-directional point-to-point communication link 26A, 26B, and 26C is a packet-based link and may include two unidirectional sets of transmission media (e.g., wires). In the embodiment illustrated in FIG. 3, the bi-directional point-to-point communication link 26B includes a first set of three unidirectional transmission media 26BA directed from I/O device 24A to I/O device 24B, and a second set of three unidirectional transmission media 26BB directed from I/O device 24B to I/O device 24A. Both the first and second sets of transmission media 26BA and 26BB include separate transmission media for a clock (CLK) signal, a control (CTL) signal, and a command/address/data (CAD) signal.

In one embodiment, the CLK signal serves as a clock signal for the CTL and CAD signals. A separate CLK signal may be provided for each byte of the CAD signal. The CAD signal is used to convey control information and data. Types of control packets include request packets, response packets, and information packets, which will be described below. The CAD signal may be n+1 bits wide, and thus may include n+1 separate transmission media.

The CTL signal is asserted when the CAD signal conveys a bit time of control information, and is deasserted when the CAD signal conveys a bit time of data. The CTL and CAD signals may transmit different information on the rising and falling edges of the CLK signal. Accordingly, two bit times may be transmitted in each period of the CLK signal.

Returning to FIG. 2, each I/O device in a daisy chain may implement either one or two bi-directional point-to-point links. For example, I/O device 24B implements two links 26B and 26C, while I/O device 24C implements only a single link 26C. Single-link I/O devices are positioned at the end of the daisy chain and, thus, each daisy chain may include only one single-link I/O device. In some embodiments, a bridge device, such as a host bridge, may be placed at both ends of the daisy chain. In such embodiments, one host bridge is designated as the master bridge and the other host bridge is designated as the slave bridge. This type of configuration can be useful to ensure continued communication with the processing subsystem 12 in the event one of the bridges, I/O devices, or point-to-point links fails. In alternative embodiments, the I/O devices may be apportioned between two host bridges at each end of the chain to balance communication traffic even in the absence of a link failure.

Because the I/O devices 24A, 24B, and 24C in the I/O subsystem 14 are connected in a daisy-chain fashion, transactions that occur between two I/O devices are not apparent to other I/O devices which are not positioned in the chain between the two I/O devices participating in the transaction. Thus, ordering of transactions cannot be agreed upon by the I/O devices in the chain. In an exemplary embodiment, to maintain control of the ordering of transactions, direct peer-to-peer communications are not permitted, and all packets are routed through the host bridge 22 at one end of the daisy chain. The host bridge 22 may include appropriate packet processing and translation logic to implement packet handling, routing, and ordering schemes to receive, translate, and direct packets to their destinations while maintaining proper ordering of transactions within I/O subsystem 14 and processing subsystem 12, if needed. Further, each I/O device may include appropriate packet processing logic to implement proper routing and ordering schemes, as will be described in further detail below.

In addition to passing through the host bridge 22, packets transmitted between the processing subsystem 12 and the I/O subsystem 14, as well as packets transmitted between I/O devices 24A, 24B, and 24C within the I/O subsystem 14, may pass through intermediate I/O devices. Generally speaking, packets within the I/O subsystem 14 travel in I/O streams, which are groupings of traffic that can be treated independently. As discussed above, in an exemplary embodiment, direct peer-to-peer communications are not permitted within the I/O subsystem 14, and all packets travel either to or from the host bridge 22. Packets which are transmitted in a direction toward the host bridge 22 are travelling "upstream." Similarly, packets which are transmitted in a direction away from the host bridge 22 are travelling "downstream."

All devices on the chain are programmed to think of the direction of their host bridge as upstream. Interconnecting the I/O devices 24 and the host bridge 22 in a daisy chain and having I/O devices communicate (at the transaction level) only with the host bridge 22 provides a logical view of the I/O subsystem 14 in which the I/O devices 24A, 24B, and 24C appear to be connected directly to the host bridge 22 but not to the other I/O devices.

Thus, for example, a packet transmitted by I/O device 24C (i.e., the requesting device) to I/O device 24A (i.e., the target device) travels upstream through I/O device 24B, through I/O device 24A, to host bridge 22, and back downstream to I/O device 24A where it is accepted. This packet routing scheme thus indirectly supports peer-to-peer communication by having a requesting device issue a packet to the host bridge 22, and having the host bridge 22 manage packet interactions and generate a packet back downstream to the target device.

Each I/O device 24A, 24B, and 24C in the I/O subsystem 14 has a unique identifier which is assigned upon initialization of the subsystem 14. In an exemplary embodiment, the unique identifier is referred to as a "unit ID," which identifies the logical source of each packet transmitted on the communication link in the I/O subsystem 14. Thus, the format of the packets used in the I/O subsystem 14 include a unit ID field to identify the source of the packet. A particular I/O device may have multiple unit IDs if, for example, the device embodies multiple devices or functions which are logically separate. Accordingly, an I/O device may generate and accept packets having different unit IDs. In an exemplary embodiment, the unit ID field in each packet comprises five bits, and, thus, thirty-two unit IDs are available for assignment to the I/O devices connected in each daisy chain in an I/O subsystem 14. The unit ID of "0" is assigned to the host bridge 22. Accordingly, any chain in an I/O subsystem 14 may include up to thirty-one physical I/O devices or thirty-one logical I/O functions.

In one embodiment, the types of packets that may be employed in I/O subsystem 14 include request packets, response packets, data packets, and information packets. Request and response packets carry control information regarding a transaction. Certain request and response packets may specify that a data packet follows. A data packet carries data associated with the transaction and the corresponding request or response packet. An information packet carries information related to the general operation of the communication link, such as flow control information, error status, etc. In alternative embodiments of the invention, other packet types and packet formats may be implemented as may be appropriate for the particular purpose and configuration of the computing system in which the packets are used.

FIGS. 4–7 illustrate exemplary formats of the various types of packets for an eight-bit communication link that may be used in one embodiment of the invention. The packet formats show the contents of eight-bit bytes transmitted in parallel during consecutive "bit times." A "bit time" is the amount of time used to transmit each data unit of a packet (e.g., a byte). Each bit time is a portion of a period of the CLK signal. For example, within a single period of the CLK signal, a first byte may be transmitted on a rising edge of the CLK signal, and a different byte may be transmitted on the falling edge of the CLK signal. In such a case, the bit time is half the period of the CLK signal. Bit times for which no value is provided in the figures may either be reserved or used to transmit command-specific or packet-specific information.

FIG. 4 illustrates an exemplary format of a request packet 30. The request packet 30 may be used to initiate a transaction (e.g., a read or write transaction), as well as to transmit requests in the process of carrying out the transaction. Generally, a request packet indicates an operation to be performed by the target device.

The bits of a command field CMD[5:0] identify the type of request and are transmitted during bit time 0. A UnitID [4:0] field is included in bit time 1 and is used to identify the logical source of the packet. The request packet 30 also includes a optional source tag field SrcTag[4:0] in bit time 2, which, together with the UnitID[4:0] field in bit time 1, may be used to associate the packet with a particular transaction of which it is a part. The address affected by the transaction is transmitted in bit times 4–7 and, optionally, in bit time 3 for the least significant address bits.

The request packet 30 may also include a sequence ID field SeqID[3:0] in bit times 0 and 1 and a pass posted write (PassPW) bit transmitted in bit time 1. The SeqID field and PassPW bit may be used in certain embodiments to facilitate packet ordering within the processing system 10, as appropriate.

FIG. 5 illustrates an exemplary format for a response packet 32. Generally, the response packet 32 is used for responses during the carrying out of a transaction that do not require transmission of the address affected by the transaction. Further, the response packet 32 may be used to transmit positive acknowledgment packets to terminate a transaction. As shown in FIG. 5, the response packet 32 includes the command field CMD[5:0], the source tag field SrcTag[4:0], and the PassPW bit similar to the request packet 30 described above. The unit ID field UnitID[4:0] in bit time 1 contains the unit ID of the device which, for downstream responses, was the source of the request packet which led to issuance of the response packet. For responses traveling upstream, the unit ID field contains the unit ID of the device which issued the response. The response packet 32 further includes a bridge bit in bit time 1 to indicate whether the response is flowing from a bridge device or some other type of device.

FIG. 6 illustrates an exemplary format for a data packet 34, which includes eight bit times on an eight-bit communication link. However, a data packet 34 may comprise different numbers of bit times dependent upon the amount of data being transferred.

FIG. 7 illustrates an exemplary format for an information packet 36, which includes four bit times on an eight-bit communication link. The information packet 36 includes the command field CMD[5:0] in bit time 0, which carries the command encoding for the packet. Information packets are used for direct peer-to-peer communications and may be used to transmit flow control information (e.g., the freeing of buffers in a node, etc.), status information about the link (e.g., synchronization, errors, etc.). In an exemplary embodiment, information packets are not buffered or flow controlled and are always accepted by the receiving node.

Figure 8:
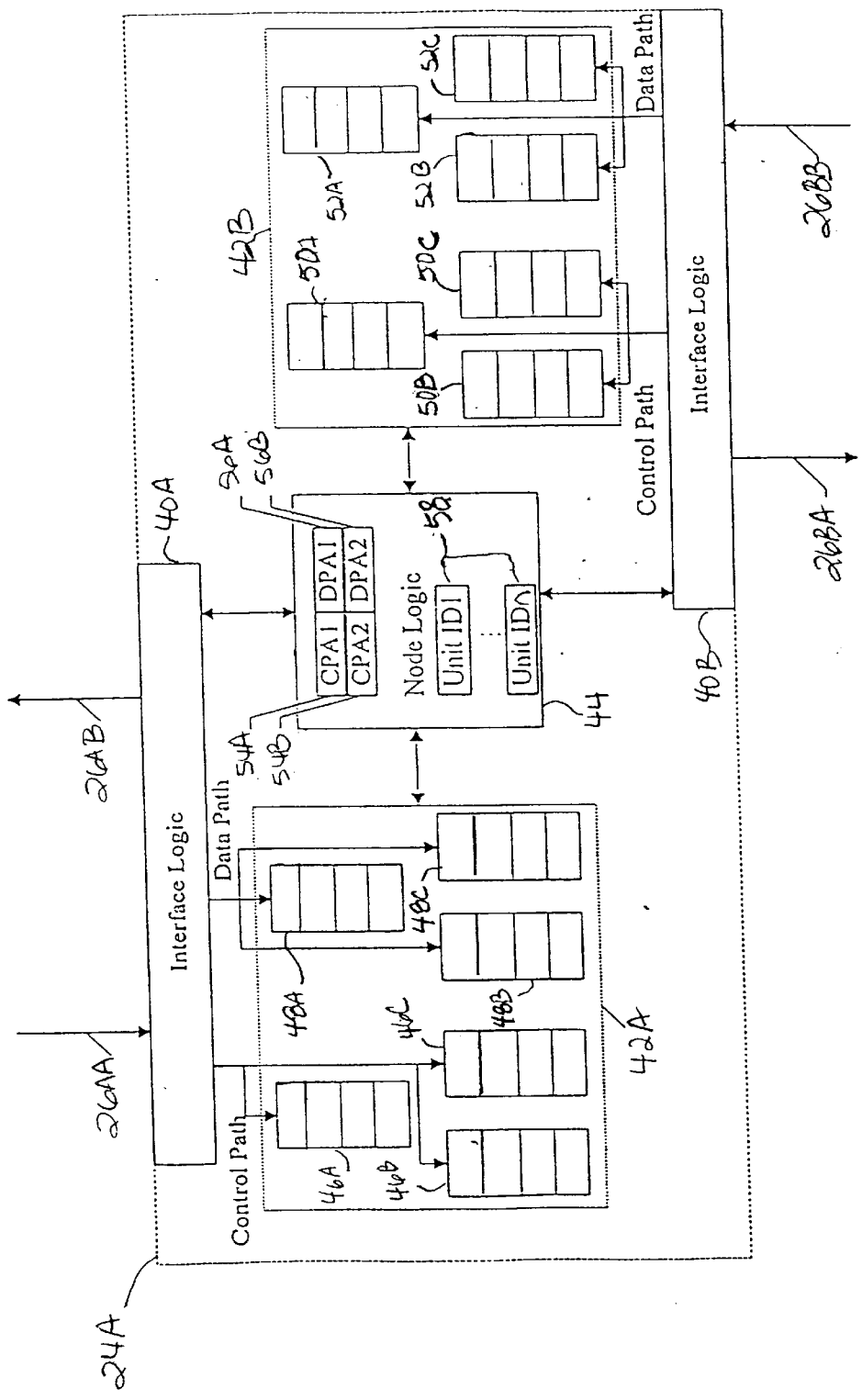
FIG. 8 illustrates an exemplary embodiment of an I/O device in the I/O subsystem shown in FIG. 2.

Turning now to FIG. 8, a block diagram illustrating one embodiment of the I/O device 24A is shown. I/O devices 24B and 24C may be configured similarly. Other embodiments are possible and contemplated. In the embodiment of FIG. 8, the I/O device 24A includes interface logic 40A and 40B, a first set of packet buffers 42A, a second set of packet buffers 42B, and a node logic 44. The interface logic 40A is coupled to links 26AA and 26AB, the packet buffers 42A, and the node logic 44. The interface logic 40B is coupled to the links 26BA and 26BB, the packet buffers 42B, and the node logic 44. The node logic 44 is further coupled to the packet buffers 42A and 42B.

The interface logic 40A and 40B implements a flow control mechanism for the transmission of packets onto a point-to-point link. Each interface logic 40A and 40B may include buffers for receiving packets from a communication link and for buffering packets to be transmitted upon the communication link, as will be described in detail below. Any suitable flow control mechanism may be implemented. For example, in one embodiment, each interface logic 40A and 40B maintains a count of the number of buffers available within the I/O device at the other end of the point-to-point link. A sending device may not transmit a packet unless the receiving device has a free buffer for storing the packet. As each buffer is freed within the receiving node (e.g., by forwarding a stored packet), the receiving node transmits a message to the sending node indicating that the buffer has been freed. Such a mechanism is referred to as a "coupon-based" system.

Generally, as used herein, a buffer is a storage element used to store one or more items of information for later retrieval. The buffer may comprise one or more registers, latches, flip-flops, or other clocked storage devices. Alternatively, the buffer may comprise a suitably arranged set of random access memory (RAM) cells. The buffer is divided into a plurality of storage locations, each storage location being configured to store one item of information of the type for which the buffer is intended. Storage locations may be allocated and deallocated in any suitable fashion. For example, the buffer may be operated as a shifting first-in, first-out (FIFO) buffer in which stored entries are shifted down in location as older entries are deleted. Alternatively, head and tail pointers may be used to indicate the oldest and most recent entry locations in the buffer, and entries may remain in a particular storage location of the buffer until deleted therefrom.

Each I/O device may include any number of buffers for storing packets as a matter of design choice. For example, an I/O device may include a common buffer pool available for all packets received from either interface of the I/O device or a common buffer pool dedicated to each interface. Alternatively, the I/O device may include several different types of buffers reserved for use by a particular type of packet. In the embodiment illustrated in FIG. 8, the I/O device 24A includes both command packet buffers (46A, 46B, 46C, 50A, 50B, and 50C) and data packet buffers (48A, 48B, 48C, 52A, 52B, and 52C). Each of these sets of buffers may be further divided into subsets as may be appropriate for the particular computing system being implemented. For example, the subsets of command packet buffers may include a subset of request buffers, a subset of response buffers, etc. Similarly, the subsets of data packet buffers may include a subset of request data buffers, a subset of response data buffers, etc.

As shown in FIG. 8, the interface logic 40A and 40B are configured to receive packets from unidirectional point-to-point links 26AA and 26BB, respectively, and to transmit packets on unidirectional point-to-point links 26AB and 26BA, respectively. In an exemplary embodiment, each interface logic 40A and 40B separates received packets into a control path and a data path. The control path from the interface logic 40A is coupled to the command packet buffers 46A, 46B, and 46C, and the data path is coupled to the data packet buffers 48A, 48B, and 48C. Similarly, the control path from the interface logic 40B is coupled to the command packet buffers 50A, 50B, and 50C, and the data path is coupled to the data packet buffers 52A, 52B, and 52C. In other embodiments, each interface logic 40A and 40B may not separate received packets into control and data paths. Instead, the node logic 44 receives the CTL signal corresponding to each bit time and performs the separation in accordance therewith.

The node logic 44 processes packets received into the buffers 42A and 42B, and initiates local packets based on the peripheral functionality implemented by the I/O device 24A. The node logic 44 also implements command packet active registers 54A and 54B corresponding to packet buffers 42A and 42B, respectively, and data packet active registers 56A and 56B corresponding to packet buffers 42A and 42B, respectively. The command packet active register and the data packet active registers may be used to identify a buffer location for a packet that is currently being received at the I/O device. Additionally, because communications on the I/O subsystem's link correspond to unit IDs, the node logic 44 includes one or more unit ID registers 58 to store the unit IDs assigned to the I/O device 24A. The number of unit ID registers 58 may vary from device to device, according to the number of unit IDs that may be implemented within that the I/O subsystem or the particular I/O device.

Node logic 44 may further include logic corresponding to the various I/O or peripheral functions performed by the I/O device 24A. For example, I/O device 24A may include storage peripherals such as disk drives, CD ROMs, DVD drives, etc. The I/O device 24A may include communications peripherals such as IEEE 1394, Ethernet, Universal Serial Bus (USB), Peripheral Component Interconnect (PCI) bus, modem, etc. Any suitable I/O function may be included in the I/O device 24A.

Figure 9:
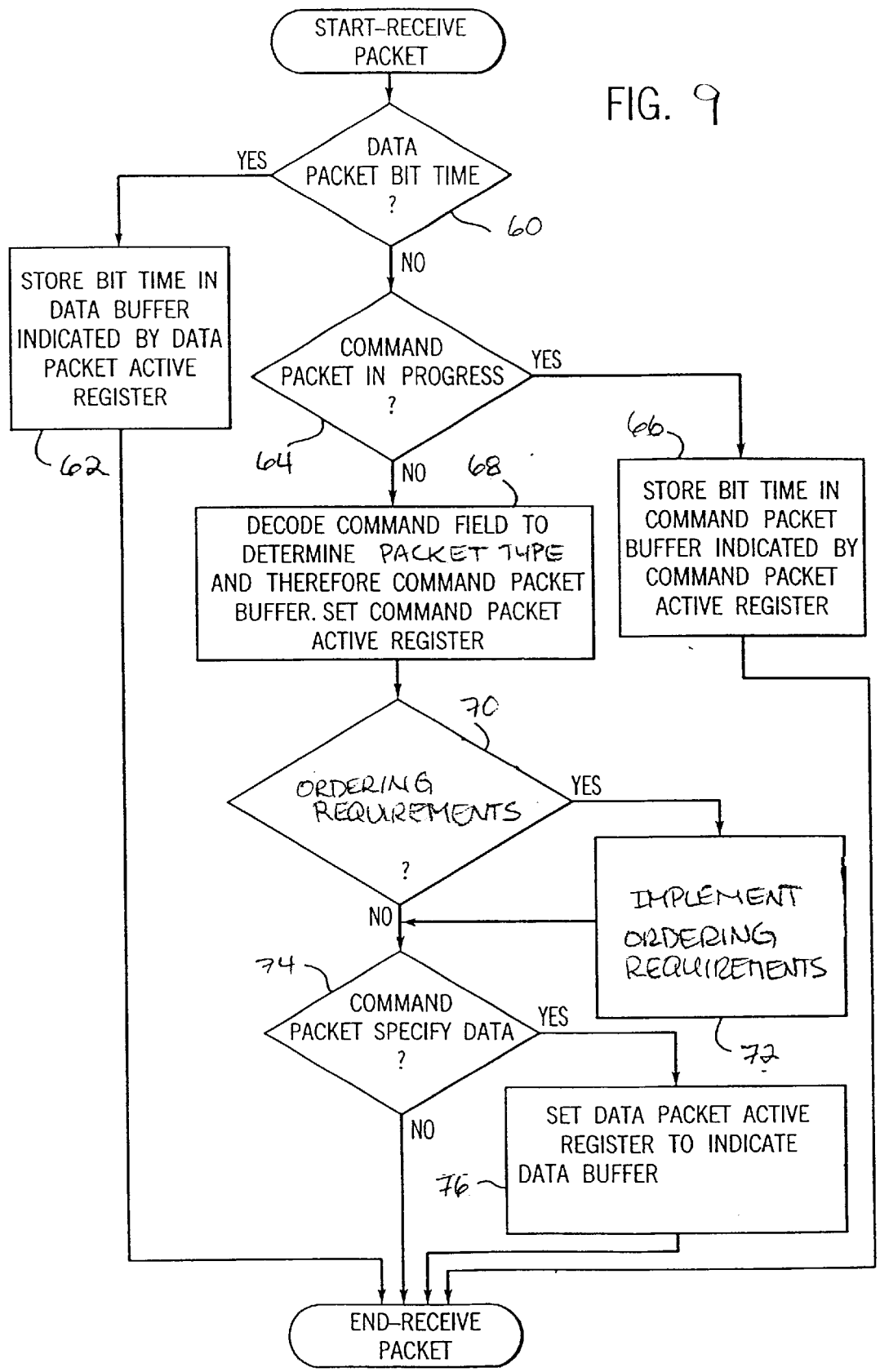
FIG. 9 is a flowchart of an exemplary portion of the logic implemented in the I/O device shown in FIG. 8, the flowchart illustrating the receipt of a packet from another I/O device.

Turning now to FIG. 9, a flowchart is shown illustrating an exemplary portion of the node logic 44 for receiving a packet. Other embodiments are possible and contemplated. While the blocks of the flowchart shown in FIG. 24 are illustrated in a particular order for ease of understanding, any suitable order may be used. Additionally, operations represented by the blocks may be performed in parallel using combinatorial logic within the node logic 44. The operations illustrated in FIG. 9 may be performed in parallel and independently for each interface logic 40A and 40B, because bit times may be received concurrently from each of the interface logics.

In the embodiment illustrated in FIG. 9, packets are received into the buffers 42A and 42B as a series of bit times. Other embodiments may accumulate the bit times of a packet in the interface logic 40A and 40B, and provide the complete packets to the buffers 42A and 42B, in which case operations related to managing the receipt of packets in bit times may be eliminated. When the bit times are received, the node logic 44 receives a signal from the interface logic indicating whether the received bit time is part of a data packet or a command packet. If the bit time is a data packet bit time (block 60), the bit time is stored in the data buffer in the allocated buffer location indicated by the data packet active register corresponding to that interface logic (block 62). If the data packet bit time is the last bit time of the data packet, the node logic 44 may invalidate the corresponding data packet active register.

If, on the other hand, the bit time is a command packet bit time, the node logic 44 determines if a command packet is currently in progress of being received (e.g., if the command packet active register is valid, block 64). If a command packet is currently in progress, the bit time is stored in the command packet buffer indicated by the command packet active register (block 66). If the command packet bit time is the last bit time of the packet, the node logic 44 may invalidate the corresponding command packet active register.

In embodiments including different types of buffers for reserved for different type of command packets, if a command packet is not currently in progress, the node logic 44 decodes the command field of the newly received packet to determine the type of command packet being received (block 68). A command packet buffer location corresponding to the determined type of command packet is allocated, and the command packet bit time is stored in the allocated command packet buffer location.

The node logic 44 also determines whether the information carried in the packet indicates any ordering requirements with respect to the packet (e.g., as may be indicated by the SeqID field, PassPW bit, etc.) (block 70). If so, the node logic 44 implements the ordering requirements as needed (block 72). For example, the packet encoding may indicate that further packet process should be suspended until another previously received packet is processed.

Additionally, the node logic 44 determines if the command packet specifies a subsequent data packet (block 74). If a data packet is specified, the node logic 44 assigns a data buffer location from the data buffer corresponding to the identified command packet type and updates the data packet active register to indicate the assigned data buffer and data buffer location (block 76).

Figure 10:
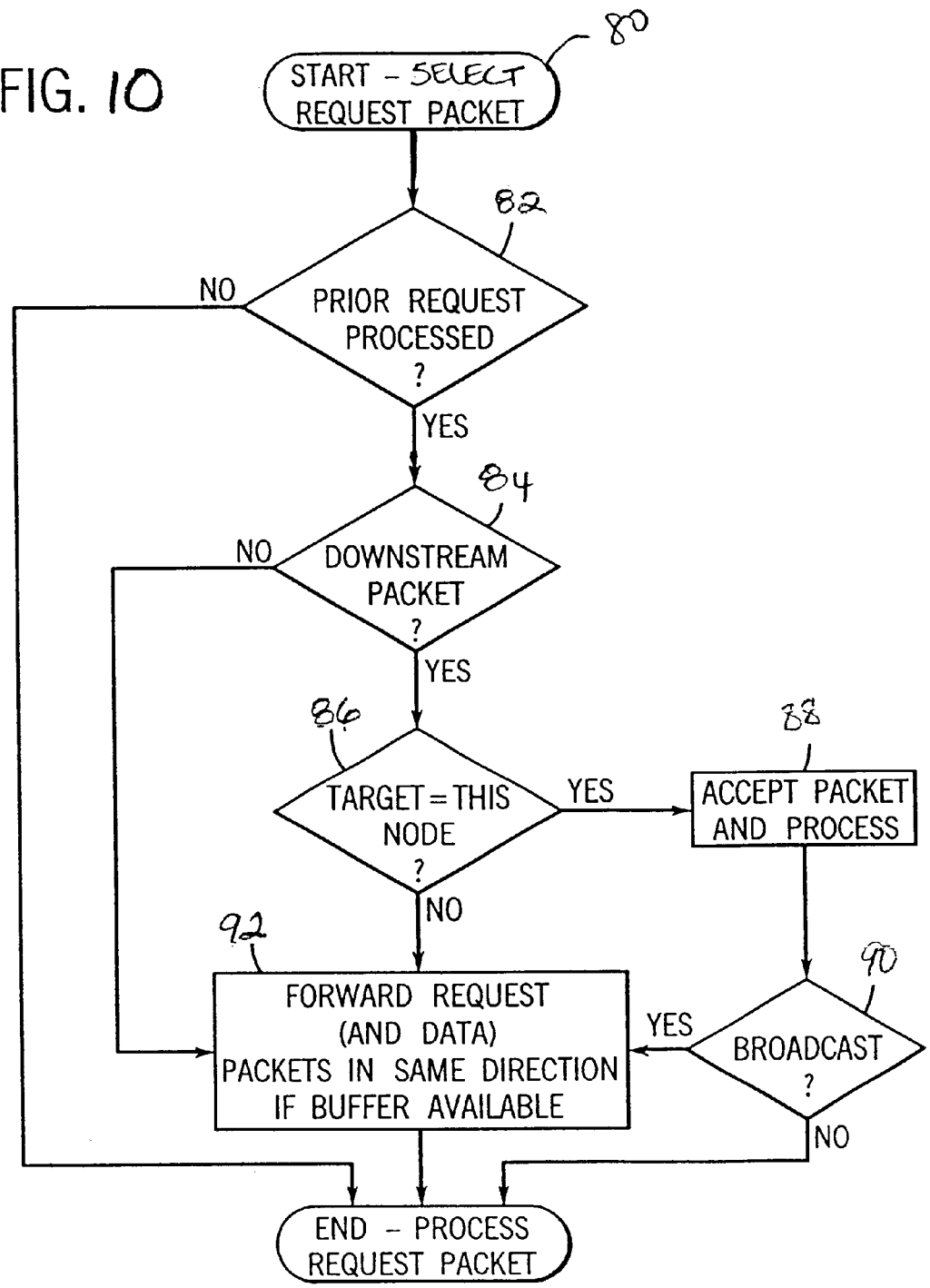
FIG. 10 is a flowchart of an exemplary portion of the logic implemented in the I/O device shown in FIG. 8, the flowchart illustrating the processing of a request packet received from another I/O device.

Turning now to FIG. 10, a flowchart is shown illustrating an exemplary embodiment of a portion of the node logic 44 for processing a request packet 30. Other embodiments are possible and contemplated. While the blocks shown in FIG. 10 are illustrated in a particular order for ease of understanding, any suitable order may be used. Additionally, operations corresponding to the various blocks may be performed in parallel using combinatorial logic within the node logic 44. The operations represented in FIG. 10 may be performed in parallel and independently for each interface logic 40A and 40B and/or each command packet buffer, because request packets from different interfaces are physically independent.

With reference to FIG. 10, a packet is selected from the buffers for processing (block 80). In an exemplary embodiment, one request packet (or one request packet per interface logic 40A and 40B) may be selected for processing according to a suitable fairness algorithm. Generally, the ordering rules of the particular I/O subsystem 14 govern the selection of packets for processing. However, packets may be selected for processing out of order, if desired, and if the ordering rules allow out-of-order selection.

Prior to processing the packet, the node logic 44 may determine from the packet encoding whether any ordering requirements have been imposed (block 82). For example, the ordering rules may dictate that the packet being received cannot be processed until a prior received request packet has been processed. If no ordering requirements are imposed or if the ordering requirements have been satisfied, then the node logic 44 determines whether the request packet is flowing upstream or downstream (block 84).

If the request packet is flowing downstream (e.g., the UnitID indicates the host bridge 22 is the source of the packet), the node logic 44 decodes the information (e.g., the command encoding, the address, etc.) in the request packet to determine whether the packet should be accepted, forwarded, or both (block 86). For example, if the packet encoding indicates that the target of the packet is this particular I/O device, then the packet is accepted by the I/O device and processed (block 88). If the encoding further indicates that the packet is a broadcast to all I/O devices on the daisy chain (block 90), then the packet is accepted, processed, and forwarded. Further, as discussed above, in some embodiments, the node logic 44 may implement logic to determine whether the packet has certain ordering requirements. For example, the information contained in the packet may indicate that processing of the packet should be suspended until processing of another packet has been completed.

The node logic 44 is configured to forward a request packet in the same direction (upstream or downstream) the packet was flowing when received at the I/O device 24 (block 92). In an exemplary embodiment, if the packet is flowing upstream (block 84), the packet is never accepted by the I/O device, and instead is forwarded until it reaches the host bridge 22 (block 92). It is noted that, once the packet is processed (e.g., either forwarded or accepted for processing by the I/O device), the packet is removed from the corresponding buffer location and, if applicable, the associated data packet is removed from the data buffer location.

It is further noted that, if a selected request packet specifies a corresponding data packet, various embodiments may process the request packet even if the data packet has not yet been received. Alternatively, processing may be delayed until arrival of the complete data packet, thus simplifying forwarding of the data packet or allowing another packet, which specifies a data packet that has completely arrived, to be forwarded on the same communication link. In situations in which processing of the request packet does not await arrival of a complete data packet, the data packet may be handled as described above with respect to FIG. 9 when the data packet finally is completely received.

Figure 11:
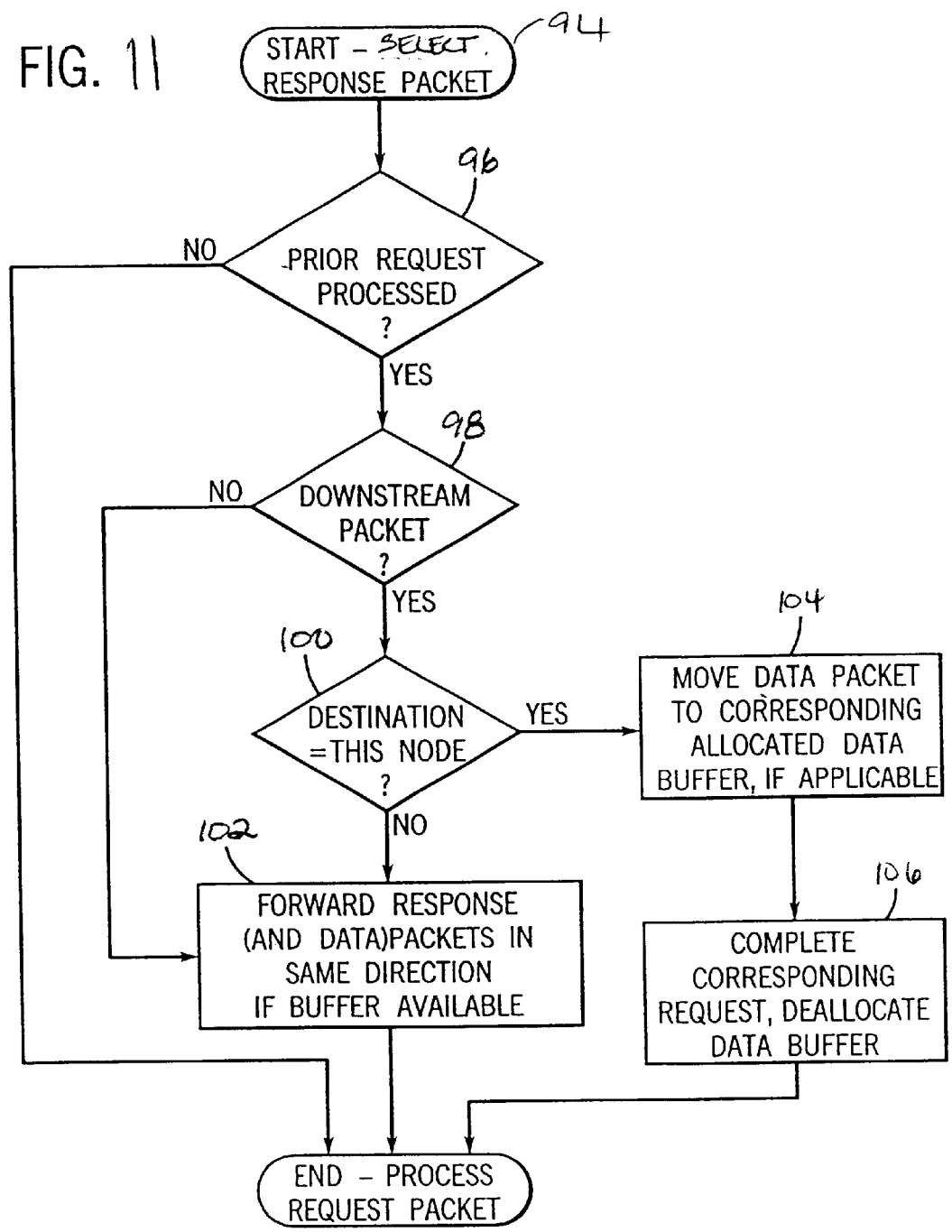
FIG. 11 is a flowchart of an exemplary portion of the logic implemented in the I/O device shown in FIG. 8, the flowchart illustrating the processing of a response packet received from another I/O device.

Turning now to FIG. 11, a flowchart is shown an exemplary embodiment of a portion of the node logic 44 for processing a response packet 32. Other embodiments are possible and contemplated. While FIG. 11 illustrates a particular order of operations for ease of understanding, any suitable order may be used. Additionally, operations may be performed in parallel using combinatorial logic within the node logic 44. The operations illustrated in FIG. 11 may be performed in parallel and independently for each interface logic 40A and 40B and/or each response packet buffer, because packets from different interfaces are physically independent.

As shown in FIG. 11, a response packet is selected from the buffers 42A and/or 42B in a manner similar to that described above with respect to FIG. 10 (block 94). Also similar to FIG. 10 above, the node logic 44 may implement an ordering requirements check prior to processing a response packet. That is, in decision block 96, the node logic 44 may determine if any ordering requirements are associated with the response packet. For example, the information contained in the response packet may indicate that processing of the response packet should be suspended until a prior request packet stored in buffers 42A and/or 42B has been processed.

The node logic 44 may determine the direction (upstream or downstream) in which the response packet is flowing by examining the state of the bridge bit in bit time 1. In one embodiment, if the bridge bit is set, then the response is flowing from the host bridge and, thus, is traveling in the downstream direction. If the bridge bit is not set, then some other device in the chain issued the response packet, and, thus, the packet is travelling in the upstream direction.

If the packet is flowing downstream (block 98), the node logic 44 determines whether to accept the packet by determining if the unit IDs in the UnitID fields of the response packets match any unit ID stored in the unit ID registers 58 (block 100). As discussed above, in downstream response packets, the UnitID is the source of the original request packet which caused issuance of the response and, thus, is indicative of the I/O device which is waiting to receive the response. If, however, the response packet is flowing upstream, the packet is never accepted by an I/O device but instead is forwarded until it reaches the host bridge 22. Accordingly, in upstream response packets, the UnitID is the target of the request which caused issuance of the response (i.e., the device issuing the response) and, thus, is not indicative of whether the I/O device receiving the upstream response should accept the upstream response.

If the destination for the response packet is another device, or if the packet is flowing upstream (block 98), the node logic 44 forwards the response packet (and corresponding data packet, if applicable) subject to availability of a free buffer location in the receiving I/O device to which the response packet is forwarded (block 102). In an exemplary embodiment, the receiving device is the device in the I/O chain which allows the response packet to flow in the same direction (upstream or downstream) as the packet already was flowing.

If the destination of the response packet is the current I/O device, the node logic 44 is configured to move the corresponding data packet, if any, to the data buffer (e.g., a response data buffer) allocated to the response packet (block 104). The node logic 44 then completes processing of the corresponding response packet, and deallocates the data buffer (block 106). It is noted that, once the response packet is processed (i.e., either forwarded or accepted by the I/O device), the response packet is removed from the command buffer location and, if applicable, the corresponding data packet is removed from the data buffer location.

It is noted that, if a selected response packet specifies a corresponding data packet, various embodiments may process the response packet even if the data packet has not yet been received. Alternatively, processing may be delayed until arrival of the data packet, thus simplifying forwarding of the data or allowing another packet, which specifies a data packet that is completely received, to be forwarded on the same link. In situations in which processing of the response packet is not delayed, the corresponding data packet may be handled as described above with respect to FIG. 9 when the data packet finally is received.

Figure 12:
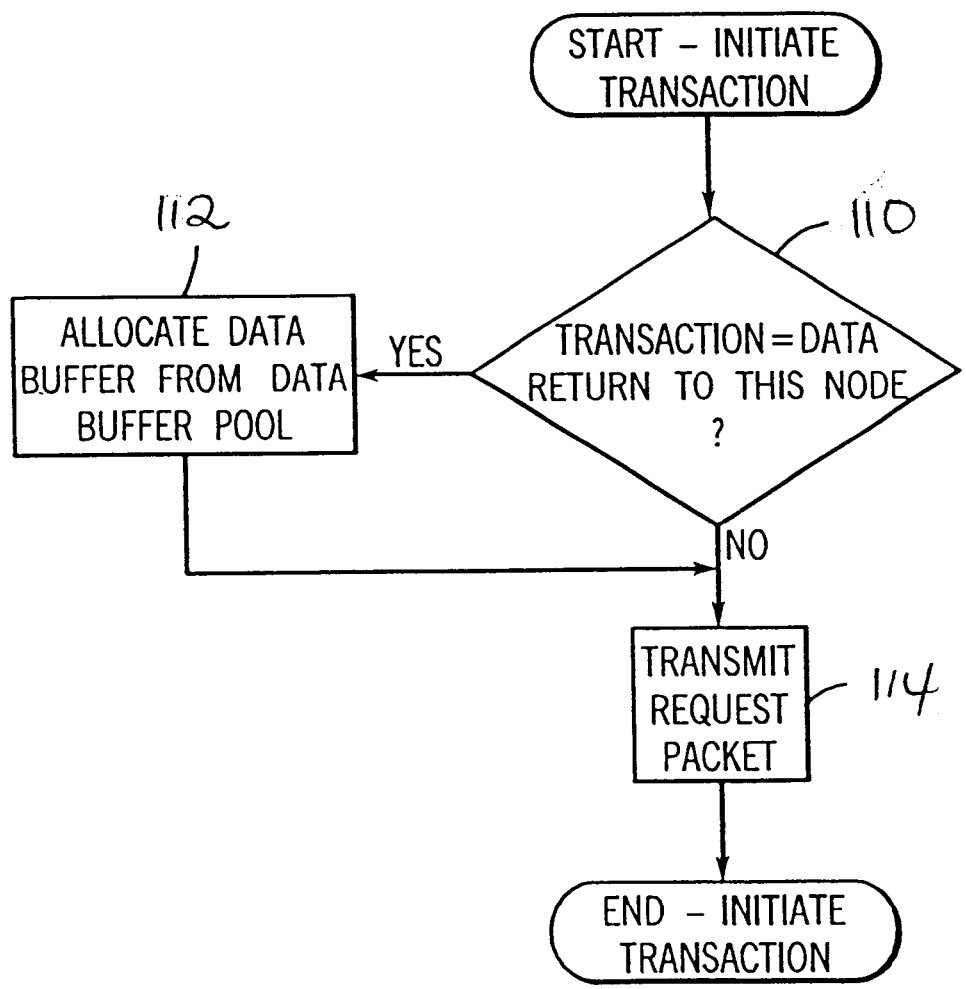
FIG. 12 is a flowchart of an exemplary portion of the logic implemented in the I/O device shown in FIG. 8, the flowchart illustrating the initiation of a transaction generated by the I/O device.

Turning now to FIG. 12, a flowchart is shown illustrating an exemplary embodiment of a portion of the node logic 44 for initiating or inserting a locally generated packet on the links to which the I/O device is coupled. Other embodiments are possible and contemplated. While the blocks shown in FIG. 12 are illustrated in a particular order for ease of understanding, any suitable order may be used. Additionally, operations represented by the blocks may be performed in parallel using combinatorial logic within the node logic 44.

As illustrated in FIG. 12, the node logic 44 determines if the transaction to be initiated may result in data being return to the I/O device (block 110). For example, read transactions initiated by the I/O device cause data to be returned to I/O device, while write transactions initiated by the I/O device do not cause data to be returned to the I/O device. If the transaction may result in data being returned to the I/O device, the node logic 44 allocates a data buffer (e.g., a response data buffer) to store the returned data (block 112). Subsequently, the node logic 44 transmits the locally generated packet to initiate the transaction (block 114). In an exemplary embodiment, locally generated packets that initiate transactions are inserted on the communication link in the upstream direction (i.e., the packets are directed towards the host bridge 22).

Because the I/O devices 24A, 24B, and 24C are connected in daisy-chain fashion, the traffic issued by an I/O device on the communication link includes both forwarded packets (i.e., packets received from another I/O device in the chain) and locally generated packets (i.e., packets which initiate a transaction from the I/O device). Further, because direct peer-to-peer communications are not supported by the I/O subsystem 14 and all transactions are directed toward the host bridge 22, each I/O device is configured to forward all packets initiated by all I/O devices which are downstream of the I/O device in addition to inserting the device's locally generated packets. Accordingly, the flow of traffic can be heavier through I/O devices which are further up the stream as compared with the downstream devices.

Moreover, because of the daisy-chain configuration, the I/O devices may be unaware of traffic flow and link access requests from other I/O devices connected in the chain. Thus, allocation of bandwidth on the communication link cannot be universally agreed upon by the devices in the chain. Still further, because a device both forwards and initiates packets on the communication link, each device allocates whatever transmit bandwidth it has between forwarded packets and initiated packets. The rate at which a device initiates packets relative to forwarding packets on the communication link is referred to as the "insertion rate" of the device. Without some sort of fairness algorithm to govern the insertion rate of each device, traffic from upstream I/O devices may consume an unfair portion of link capacity as compared to downstream I/O devices, potentially stalling traffic from downstream I/O devices indefinitely.

In an exemplary embodiment, to prevent stalls and to facilitate a fair allocation of bandwidth among the various devices, the insertion rate of each device in the daisy chain is managed by a fair bandwidth allocation scheme. Although a scheme which manages insertion rates results in distribution of available bandwidth, it does not imply that a particular amount, or portion, of the available bandwidth will be allocated to any one device. This result occurs because packet insertion rates, rather than actual bandwidth allocation, are governed, and the sizes of packets transmitted on the link may not be uniform. Thus, devices which issue packets of less than the maximum size may not use a full share of bandwidth.

The fair bandwidth allocation scheme in the exemplary embodiment is achieved by configuring each I/O device 24A, 24B, and 24C to establish an insertion rate that matches the highest packet issue rate of the I/O devices downstream from that I/O device. "Packet issue rates" are determined by an upstream device for each device downstream of the upstream device. The packet issue rate of any particular downstream device is a measurement of the number of locally generated packets received by the upstream device from that particular downstream device relative to the total number of packets received from all downstream devices. Matching the upstream I/O device's insertion rate to the highest packet issue rate of any downstream I/O device provides for balancing and consistency of traffic through each I/O device with respect to the other I/O devices.

To further optimize allocation of bandwidth, once the insertion rate for a particular I/O device is determined, the I/O device can be configured to pace the insertion of locally generated packets to avoid insertion of bursts of local packets. Such a pacing scheme further serves to ensure that bandwidth is allocated in a fair manner.

In one embodiment, to more optimally use available bandwidth, each I/O device may be configured to insert any locally generated packets onto the communication link if idle time is available. In such a case, the device is simply using available idle bandwidth. That is, if idle bandwidth is available on the outbound link, the resource is not contended and allocation is not needed.

In some embodiments, it may be desirable to dynamically alter a device's insertion rate as traffic patterns on the communication link change. A dynamic insertion rate further ensures that the communication link bandwidth is used in an optimal manner.

Implementation of a dynamic fair bandwidth allocation algorithm includes monitoring the flow of traffic at each receiving I/O device to determine the packet issue rates of downstream devices. Because each I/O device has a unique identifier (e.g., unit ID), each I/O device can associate each received packet with the I/O device which initiated the packet. The packet issue rate for each downstream device then can be determined based on the ratio of received packets associated with each downstream device to the total number of received packets. The highest packet issue rate of any downstream device can then be identified. If the receiving I/O device then matches its insertion rate to the highest packet issue rate, the receiving I/O device will be capable of inserting the same number of locally generated packets into the stream during any given window of time as the highest bandwidth requester downstream of the receiving device. If each device in the chain performs the same calculation and matches its insertion rate to the highest packet issue rate of the downstream devices, then all devices in the chain will be capable of inserting the same number of locally generated packets in the upstream direction. If a particular device does not use the full bandwidth allocated to it (i.e., the device does not have enough locally generated packets ready to transmit), then the excess bandwidth may be allocated equally among the other devices.

If the flow of packet traffic is monitored by an upstream I/O device during only one window in time, then the upstream I/O device may determine a fixed insertion rate. However, if monitoring is performed in sequential time windows, downstream packet issue rates may be determined continuously such that the monitoring device's insertion rate can be changed dynamically in response to altered traffic patterns. In one embodiment, the window of time during which monitoring occurs is large enough to consider enough packets such that the calculation of insertion rate is statistically convergent. However, the time window also is small enough such that dynamic insertion rate determinations are sufficiently responsive to dynamic traffic patterns.

Figure 13:
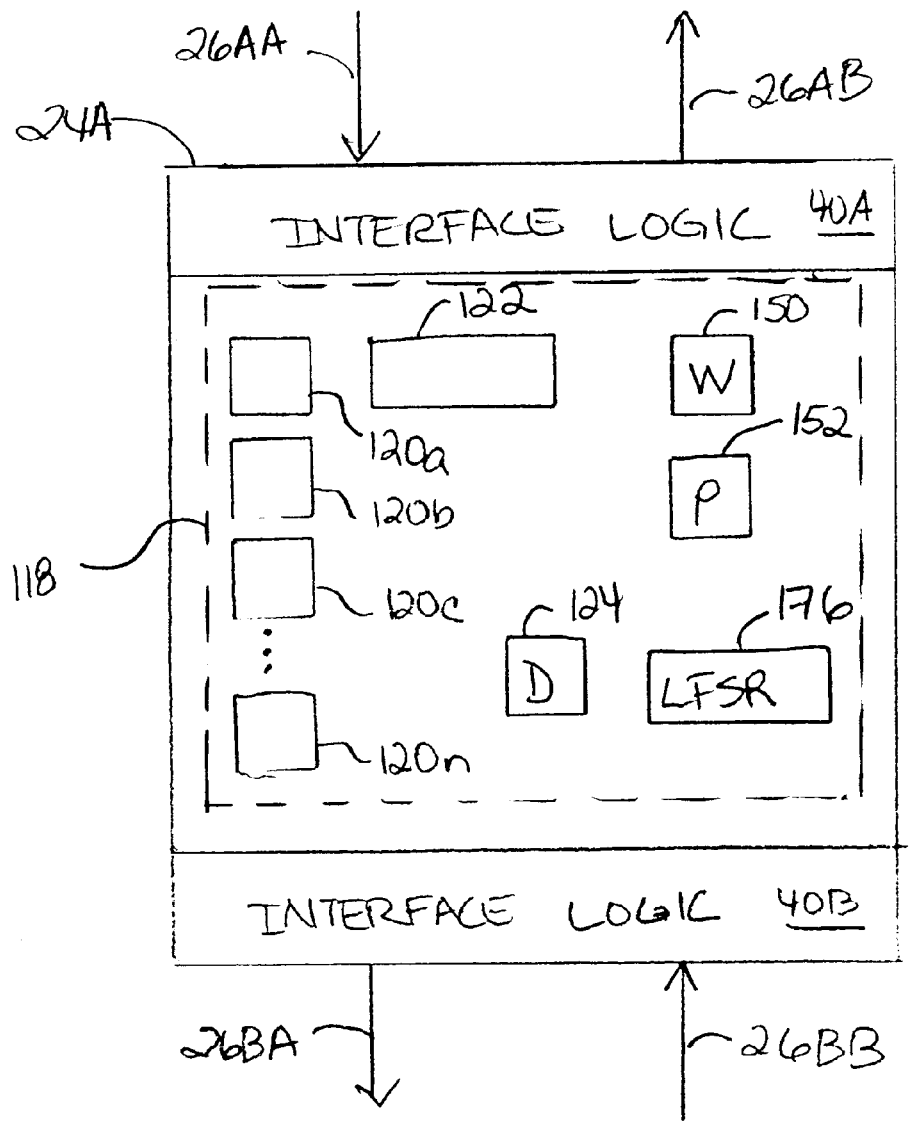
FIG. 13 is an exemplary embodiment of the I/O device shown in FIG. 2, illustrating logic to implement a bandwidth allocation algorithm in accordance with the invention.

Alternatively, rather than employ a fixed time window, a packet counting technique may be implemented. In an exemplary embodiment of the invention, and as illustrated in FIG. 13, each I/O device (e.g., I/O device 24A) may implement fair bandwidth allocation logic 118 including a plurality of counters $120a$, $120b$, $120c$, . . . to $120n$ which correspond to each potential downstream I/O device. For example, in an embodiment in which thirty-one unit IDs are available for assignment to the I/O devices in any single daisy chain in the I/O subsystem 14, each I/O device implements thirty-one counters 120. Each of the counters 120 counts the number of packets received from the corresponding I/O device. Further, each I/O device may implement a total counter 122 to count the total number of packets received from all of the downstream devices. Although the embodiment illustrated in FIG. 13 illustrates the counters 120 and 122 as separate from the interface logic 40A and 40B, it should be understood that the counters 120 and the total counter 122 can be part of the interface logic 40A and/or 40B, the node logic 44, or separate. Further, the counters 120 and the total counter 122 can be implemented in hardware and/or software, as desired. In an exemplary embodiment, the number of packets received from downstream devices are counted as the packets are forwarded within the receiving device to the transmitter for the outgoing point-to-point link (e.g., link 26AB).

In an exemplary embodiment, the counters 120 are implemented in hardware and are sized such that a counter overflows when a predetermined number of packets is received from the corresponding downstream I/O device. In the exemplary embodiment, the counters 120 are three-bit counters such that each counter overflows when eight packets from the associated downstream I/O device is counted. The inventors have determined that a count of eight packets is sufficient to ensure that the window during which packet flow is monitored for each determination of the insertion rate is sufficiently large for statistical convergence, yet sufficiently small to respond to dynamic traffic patterns. The total counter 122 is an eight-bit counter, which, in the exemplary embodiment, is sufficiently large to maintain a count of the total packets that may be received from the downstream devices until a three-bit counter 120 overflows. The I/O device 24A also includes a "D" register 124 to store the value of the total counter 122 when a three-bit counter 120 overflows. The value in the "D" register is a denominator used in the calculation of the highest packet issue rate, as will be described below. It should be understood, however, that the size of the counters and the number of packets counted may vary depending on the particular implementation of the computing system. For example, some systems may implement a larger number of devices in a chain, may require greater precision in performance and thus more exact allocation of bandwidth, may have traffic patterns which are substantially static, etc. Factors such as these may influence the choice of the size of the counters, the number of packets counted, etc.

Figure 14:
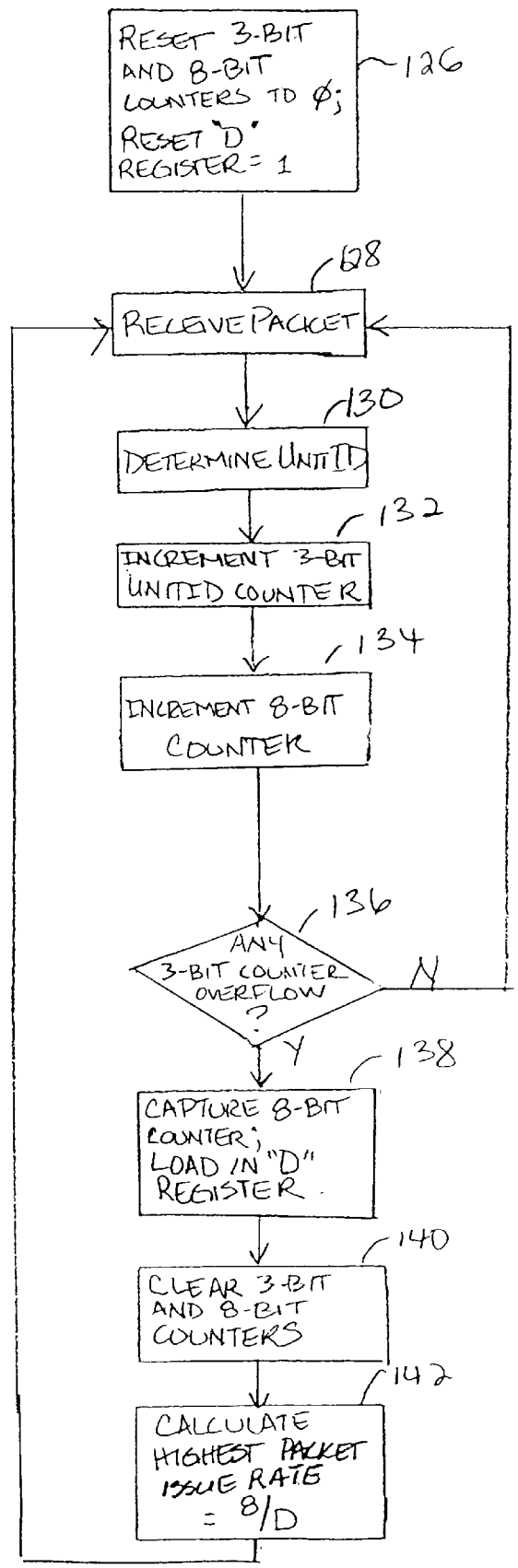
FIG. 14 is a flowchart of an exemplary portion of the bandwidth allocation algorithm implemented in the I/O device shown in FIG. 13, the portion of the algorithm being used to calculate an insertion rate for the I/O device.

Turning now to FIG. 14, a flowchart illustrating an exemplary implementation of the fair bandwidth allocation algorithm is provided. It should be understood that the order of the blocks illustrated in the flowchart are for convenience of discussion only and that certain blocks may be performed in any order or in parallel with other blocks.

At reset of the I/O device 24A, the counters 120 and the total counter 122 are reset to a value of "0," and the "D" register is set to a value of "1" (block 126). Upstream packets are received at interface logic 40B from unidirectional point-to-point link 26BB (block 128). The I/O device 24A is configured to associate each received packet with a particular downstream device (block 130). For example, either the node logic 44, the interface logic 40A, or the interface logic 40B may be configured to examine the UnitID field of the received packet to identify the associated downstream device. Based on the contents of the UnitID field, the corresponding three-bit counter 120 is incremented (block 132) and the eight-bit total counter 122 is incremented (block 134). As discussed above, in the exemplary embodiment, packets are counted as they are forwarded within the I/O device to the transmitter for the outgoing point-to-point link 26AB. However, it should be understood that the packets may be counted at any time during the processing of the packet. For example, a packet may be counted when it is allocated to a buffer, placed in a buffer, selected from a buffer, or as it is received by the I/O device.

Returning to the flowchart in FIG. 14, if counting of the received packets has not resulted in the overflow of any of the three-bit counters 120 (block 136), then the I/O device 24A returns to block 128 and continues to receive and count packets. If, however, a counter 120 has overflowed, then the value of the eight-bit total counter 122 is captured and stored in the D register 124 (block 138). The three-bit counters 120 and the eight-bit total counter 122 then are cleared and reset to "0." The insertion rate for the I/O device 24A then may be calculated by determining the highest packet issue rate of the downstream devices. In the embodiment illustrated in FIG. 14, the highest packet issue rate is equal to 8/D (i.e., the ratio of the number of packets initiated by the downstream node with the heaviest traffic to the total number "D" of packets received by the I/O device 24A during the time in which the heaviest downstream node initiated the eight packets). Thus, on average, the I/O device 24A may insert (i.e., initiate) eight locally generated packets for every "D" packets that the I/O device forwards.

After determining its insertion rate, the I/O device 24A continues to receive and count packets and to determine new insertion rates. Thus, the I/O device 24A can adjust its insertion rate dynamically as traffic patterns on the communication link alter.

As discussed above, to more optimally attain fair allocation of bandwidth, the insertion of local packets relative to forwarding of received packets may be paced rather than implemented as bursts. Pacing may be accomplished by any pacing or priority algorithm which fairly arbitrates between the transmission of local packets and forwarded packets at the device's insertion rate.

Figure 15:
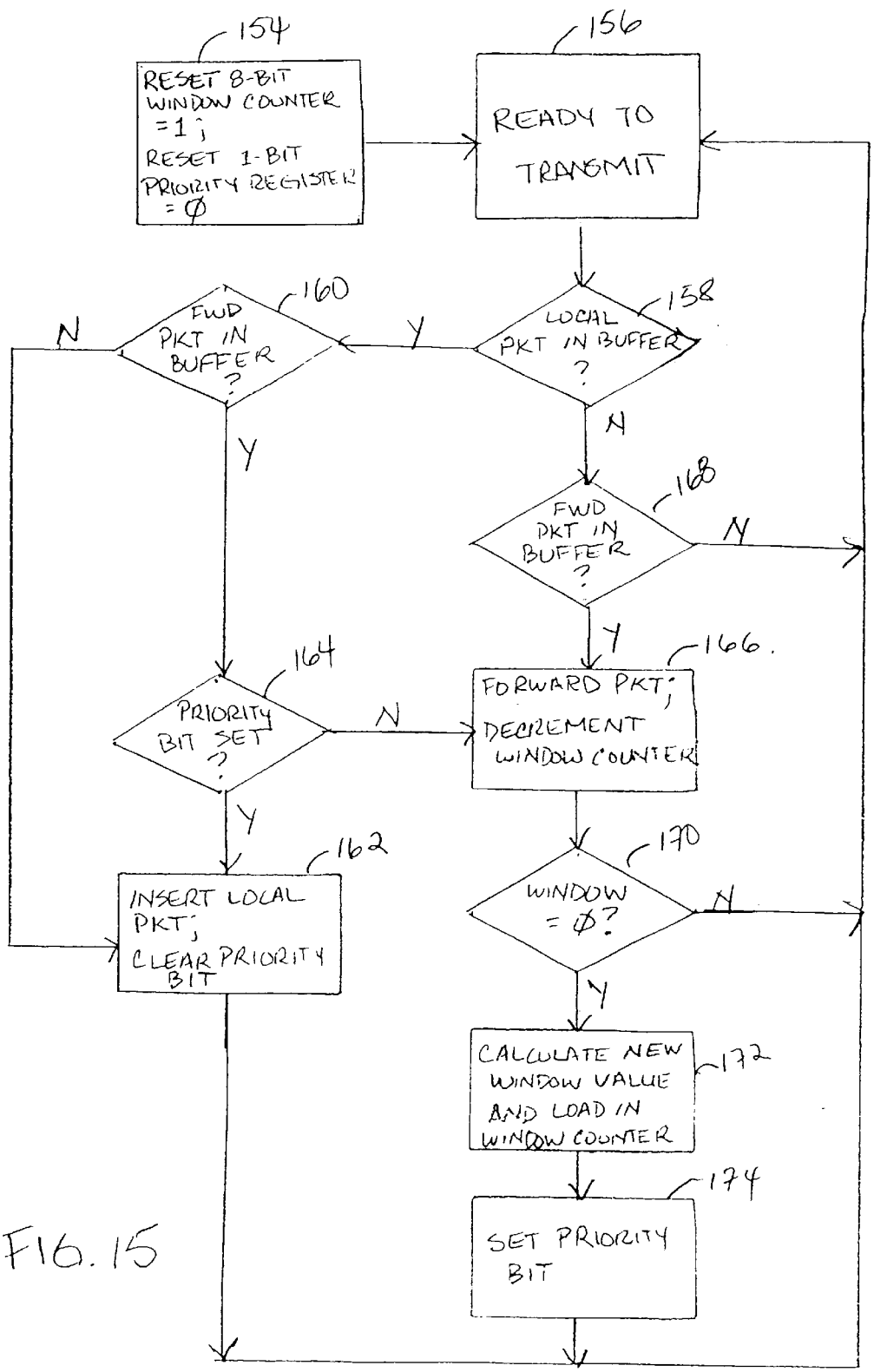
FIG. 15 is a flowchart of an exemplary portion of the bandwidth allocation algorithm implemented in the I/O device shown in FIG. 13, the portion of the algorithm being used to pace the insertion of packets at the calculated insertion rate.

In the exemplary embodiment illustrated in FIGS. 13 and 15, the fair bandwidth allocation logic 118 in the I/O device 24A implements a priority algorithm using a Window counter 150 and a Priority register 152. Although the embodiment illustrated in FIG. 13 illustrates the counter 150 and the register 152 as separate from the interface logic 40A and 40B, it should be understood that the counter 150 and the register 152 can be part of the interface logic 40A and/or 40B, the node logic 44, or separate. Further, the counter 150 and the register 152 can be implemented in hardware and/or software, as desired. In an exemplary embodiment, the Window counter 150 and the Priority register 152 are implemented in hardware. The Window counter 150 is an eight-bit counter, and the Priority register is a one-bit register.

The implementation of the exemplary priority algorithm using the Window counter 150 and the Priority register 152 is illustrated in the flowchart of FIG. 15. It should be understood that the order of the blocks illustrated in the flowchart are for convenience of discussion only and that certain blocks may be performed in any order or in parallel with other blocks.

At reset of the I/O device 24A, the Window counter 150 is set to a value of "1," and the one-bit Priority register 152 is set to a value of "0" (block 154). When the I/O device 24A is ready to transmit a packet upstream onto the point-to-point link 26AB (e.g., if a buffer is available in the receiving device to store the packet) (block 156), the I/O device determines whether a locally generated packet is in a buffer ready to be transmitted (block 158). If so, and if a forwarded packet is not currently stored in a buffer (block 160), then the local packet is inserted onto the link 26AB, and the Priority register is cleared (block 162).

If, however, both a local packet is in a buffer (block 158) and a forwarded packet is in a buffer (block 160), then the I/O device 24A examines the Priority register 152 to determine whether the bit is set (block 164). A set Priority bit indicates that a local packet has not been inserted during the Window represented by the Window counter 150. Thus, if the Priority bit is set, then the local packet is inserted onto the link 26AB, and the Priority bit is cleared (block 162).

If both a local packet is in a buffer (block 158) and a forwarded packet is in a buffer (block 160) and the Priority bit 152 is not set (i.e., a local packet has already been sent within the Window count) (block 164), then the I/O device 24A selects the forwarded packet, issues it onto the link 26AB, and decrements the Window counter 150 (block 166).

Similarly, if a local packet is not in a buffer (block 158) and a forwarded packet is in a buffer (block 168), then the I/O device 24A issues the forwarded packet onto the link 26AB and decrements the Window counter 150 (block 166).

When the Window counter 150 is decremented to a value of "0" (i.e., the local packets have been paced with respect to the number of forwarded packets as determined by the Window counter value) (block 170), then the I/O device 24A calculates a new value for Window in accordance with the priority algorithm and loads the new value into the Window counter 150 (block 172). In the exemplary embodiment, when the value for Window is recalculated, the dynamic changes in the insertion rate are taken into account, as will become apparent from the description below. Along with calculating a new value for Window, the Priority bit 152 also is set (block 174), and the priority algorithm continues to pace the insertion of the local packets onto the communication link at the insertion rate.

The value loaded into the Window counter 150 at block 172 may be any value to ensure that the insertion of local packets is paced. In the exemplary embodiment, the pacing is set such that the I/O device may insert one packet for every D/8 packets forwarded, where "D" is the total number of received packets, which is stored in the D register 124 and which may vary dynamically. Thus, the value loaded into the Window counter 150 at block 172 may be representative of the value of D/8.

In some embodiments, however, the calculation of D/8 may yield a non-integral value. To compensate for the non-integral calculation, the calculation of the value loaded into the Window counter 150 may be performed probabilistically. In the exemplary embodiment illustrated in FIG. 13, each I/O device (e.g., I/O device 24A) implements the probabilistic calculation through the use of a linear feedback shift register (LFSR) 176. In one embodiment the LFSR 176 is a nine-bit register which implements the polynomial:

$$x^9+x^4+1$$

The LFSR 176 is advanced once every time the value for the Window register 150 is recalculated, and the three least significant bits of the LFSR 176 (constituting a three bit pseudo-random number) are added to D. The bottom three bits of this sum then are dropped, and the top bits used for the new Window register value. Thus, the value loaded into the Window register 150 corresponds to:

$$(D+LFSR[2:0])/8$$

rounded down. As the LSFR value is random and evenly distributed, this is equal, when averaged over a large number of iterations, to D/8.

In other embodiments of the invention, the particular polynomial and the width of the LFSR register may be different than the embodiment described above, depending on the particular implementation of the computing system. Further, it is contemplated that alternative embodiments of the inventions may compensate for non-integral Window values through the implementation of other appropriate algorithms or counting techniques.

Figure 16:
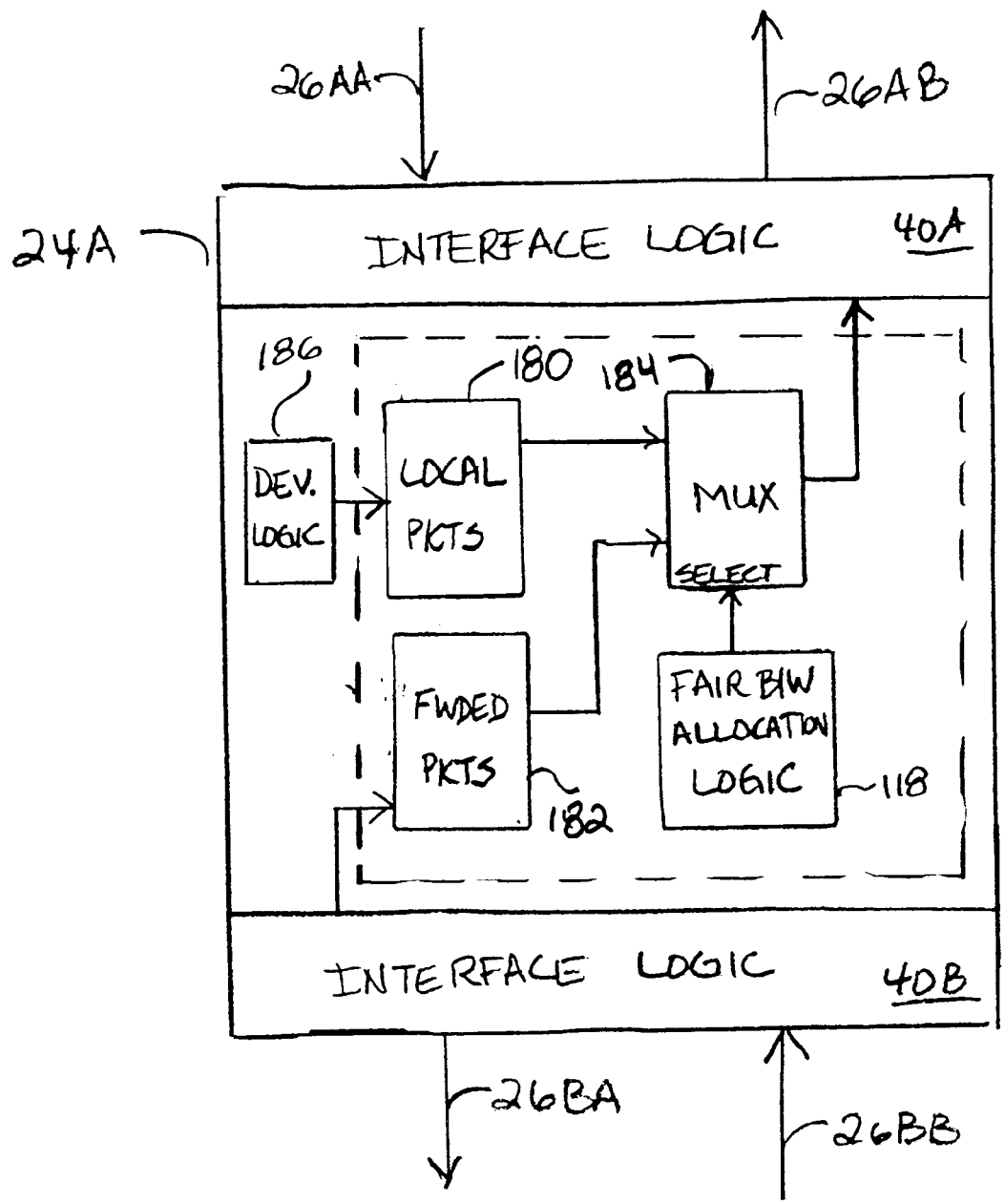
FIG. 16 is an exemplary embodiment of an I/O device which has the transmission of packets governed by the bandwidth allocation algorithm described with respect to FIGS. 13–15.

The fair bandwidth allocation logic described with respect to FIGS. 13–15 above generally may be described as a two-bit arbiter between local packets and forwarded packets. An exemplary representation of such a two-bit arbiter implemented in the device 24A is illustrated in FIG. 16. As shown, the device 24A includes a local packet buffer 180 in which local packets that are ready to transmit onto link 26AB are queued. Similarly, the device 24A includes a forwarded packet buffer 182 in which forwarded packets that are ready to transmit onto link 26AB are queued. The buffers 180 and 182 are connected to a multiplexor 184 which has a "select" input connected to the fair bandwidth allocation logic 118. The output of the multiplexor 184 is coupled to the interface logic 40A. Thus, the multiplexor 184 provides to the interface logic 40A either a local packet or a forwarded packet for transmission onto link 26AB as determined by the fair bandwidth allocation logic 118.

In the exemplary embodiment illustrated in FIG. 16, the buffers 180 and 182, the multiplexor 184, and the fair bandwidth allocation logic 118 may be implemented as part of the node logic 44 and the buffer sets 42A and 42B illustrated in FIG. 8, with the forwarded packets being received from the interface logic 40B. The packets stored in the local packets buffer 180 are packets which are generated by device-specific logic 186 within the device 24A, The logic 186 may generally implement device-specific functions based on the particular type of device 24A and/or logical function embodied within the device 24A.

Although the embodiments above have been described with respect to I/O devices interconnected in a daisy-chain fashion in an I/O subsystem, it should be understood that the fair bandwidth allocation scheme applies equally to any system of daisy-chained devices in which the devices are competing for access to a communication link. Further, although the allocation algorithm has been described with respect to monitoring only the upstream flow of packets, each device in the daisy-chain structure also may be configured to monitor the downstream flow and fairly allocate bandwidth in the downstream direction. Such a configuration may be particularly useful in daisy-chain structures having a host bridge at each end, if packets may be inserted by I/O devices in the downstream direction. Still further, the foregoing has included descriptions of exemplary packet formats and packet processing logic for receiving, translating, processing, ordering, etc. packets in the computing system. Such exemplary descriptions have been provided merely to establish an environment in which to describe the invention and are not intended to be limiting to the invention. Rather, it is intended that other embodiments of the invention may implement different types of packet formats and packet processing logic.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of allocating bandwidth to a plurality of devices transmitting packets on a communication link implemented as a plurality of point-to-point links, each point-to-point link interconnecting a respective two devices of the plurality of devices, the method comprising the acts of:

determining, at a first device of the plurality of devices, a packet issue rate of a second device connected to the communication link, the packet issue rate corresponding to a number of second local packets generated by the second device and received by the first device on a first point-to-point link of the plurality of point-to-point links relative to a total number of received packets received by the first device on the first point-to-point link, the received packets including the second local packets; and matching an insertion rate of the first device to the packet issue rate, the insertion rate corresponding to insertion of first local packets generated by the first device relative to forwarding of the received packets onto a second point-to-point link of the plurality of point-to-point links.

2. The method as recited in claim 1, comprising the act of: transmitting, at the first device, the first local packets and the received packets at the insertion rate onto the second point-to-point link.

3. The method as recited in claim 2, comprising the act of: pacing the transmitting at the first device of the first local packets relative to the received packets at the insertion rate onto the second point-to-point link.

4. The method as recited in claim 3, wherein the act of pacing comprises:

arbitrating between a first of the first local packets and a first of the received packets when both the first of the first local packets and the first of the received packets are ready to transmit onto the second point-to-point link;

transmitting the first of the first local packets when the first of the first local packets is ready to transmit and none of the received packets are ready to transmit onto the second point-to-point link; and transmitting the first of the received packets when the first of the received packets is ready to transmit and none of the first local packets are ready to transmit.

5. The method as recited in claim 1, wherein the act of determining the packet issue rate of the second device comprises:

counting, at the first device, the number of second local packets received on the first point-to-point link; and counting, at the first device, the total number of received packets received on the first point-to-point link.

6. The method as recited in claim 5, wherein the acts of counting the number of second local packets and counting the total number of received packets occurs within a window of predetermined length.

7. The method as recited in claim 6, wherein the predetermined length of the window is a length of time.

8. The method as recited in claim 6, wherein the predetermined length of the window is correlative to receipt of a predetermined number of second local packets at the first device.

9. The method as recited in claim 5, wherein the acts of counting the number of second local packets and counting the total number of received packets occur as each of the received packets is received at the first device.

10. The method as recited in claim 5, wherein the acts of counting the number of second local packets and counting the total number of received packets occur as each of the received packets is forwarded by the first device onto the second point-to-point link.

11. The method as recited in claim 1, wherein the act of determining the packet issue rate and the act of matching the insertion rate to the packet issue rate are performed dynamically.

12. The method as recited in claim 1, wherein each of the plurality of devices connected to the communication link downstream of the first device has a respective packet issue rate as determined at the first device, and wherein the act of determining, at the first device, the packet issue rate comprises determining a highest packet issue rate of the respective packet issue rates, and wherein the act of matching the insertion rate of the first device to the packet issue rate comprises matching the insertion rate to the highest packet issue rate of the respective packet issue rates.

13. The method as recited in claim 12, wherein the act of determining a packet issue rate and the act of matching an insertion rate to the packet issue rate are performed at each device of the plurality of devices, wherein the packet issue rate determined by a particular device is the highest packet issue rate of the respective packet issue rates of the plurality of devices downstream of the particular device, and wherein the insertion rate is the respective insertion rate of the particular device.

14. The method as recited in claim 1, wherein the first device and the second device comprise input/output devices.

15. A method of allocating bandwidth to a plurality of devices transmitting packets on a communication link implemented as a plurality of point-to-point links, each point-to-point link interconnecting a respective two devices of the plurality of devices, the method comprising the acts of:

monitoring a flow of a plurality of received packets received at a first device of the plurality of devices;

associating each of the plurality of received packets in the monitored flow with a respective device of the plurality of devices, wherein each device is configured to transmit local packets associated with that device and received packets associated with other devices of the plurality of devices onto one of the point-to-point links, and wherein a number of local packets associated with a respective device relative to a total number of received packets in the monitored flow at the first device corresponds to a respective packet issue rate of the respective device; and determining a highest packet issue rate of the respective packet issue rates.

16. The method as recited in claim 15, comprising the act of transmitting, onto the communication link by the first device, at an insertion rate that matches the highest packet issue rate, local packets associated with the first device and received packets associated with other devices of the plurality of devices.

17. The method as recited in claim 16, wherein the act of transmitting comprises the act of arbitrating between the local packets associated with the first device and the received packets associated with the other devices of the plurality of devices.

18. The method as recited in claim 15, wherein the act of determining the highest packet issue rate is performed dynamically.

19. The method as recited in claim 15, comprising the act of counting, in the monitored flow, a number of local packets associated with each of the respective devices of the plurality of devices, wherein the act of determining the highest packet issue rate is performed when the number of local packets associated with one of the respective devices exceeds a predetermined threshold number.

20. The method as recited in claim 15, wherein the acts of monitoring, associating, and determining are performed at each device of the plurality of devices.

21. A device configured to transmit packets on a communication link implemented as a plurality of point-to-point links, the device comprising:

a first interface to receive packets from a first point-to-point link of the plurality of point-to-point links, the received packets being transmitted by at least one other device connected to the communication link, a second interface to transmit packets onto a second point-to-point link of the plurality of point-to-point links, the transmitted packets comprising local packets generated by the device and received packets forwarded by the device; and allocation logic operably coupled to the first interface and the second interface, the allocation logic being configured to monitor a flow of packets received from the first point-to-point link, and to determine, based on the monitored flow, a device insertion rate for transmitting local packets relative to forwarding received packets onto the second point-to-point link; wherein the allocation logic is configured to associate each packet in the monitored flow of packets received from the first point-to-point link with a respective other device connected to the communication link, wherein each respective other device has a respective packet issue rate corresponding to the number of packets in the monitored flow associated with the respective other device relative to the total number of received packets received from the first point-to-point link, and wherein the allocation logic is configured to determine a highest packet issue rate of the respective packet issue rates, and to match the device insertion rate to the highest packet issue rate.

22. The device as recited in claim 21, wherein the allocation logic is configured to monitor the flow of packets within a window having a predetermined length.

23. The device as recited in claim 22, wherein the allocation logic is configured to count a number of received packets associated with each of the respective other devices, and wherein the predetermined length of the window is correlative to the number of received packets associated with any one of the respective other devices exceeding a threshold number.

24. The device as recited in claim 23, wherein the allocation logic comprises a total count register and a plurality of device registers, each device register corresponding to a respective other device connected to the communication link, wherein the allocation logic increments the total count register for each packet received at the first interface, and wherein the allocation logic increments each device register for each packet received at the first interface that is associated with the corresponding respective other device.

25. The device as recited in claim 21, comprising arbitration logic operably coupled to the second interface to pace transmitting of the local packets relative to forwarding of the received packets onto the second point-to-point link at the device insertion rate.

26. The device as recited in claim 21, wherein the device comprises an input/output device.

27. A data communication system, comprising:
a communication link comprising a plurality of point-to-point links; and
a plurality of devices connected to the communication link, wherein each of the plurality of point-to-point links interconnects a respective two of the plurality of devices, and wherein each of the plurality of devices comprises:
  a first interface to receive packets from a first point-to-point link of the plurality of point-to-point links;
  a second interface to transmit packets onto a second point-to-point link of the plurality of point-to-point links, wherein transmitted packets include local packets initiated by the device and received packets initiated by other devices of the plurality of devices, and wherein the second interface transmits the local packets relative to the received packets at a device insertion rate; and
  allocation logic operably coupled to the first interface and the second interface, the allocation logic being configured to:
    monitor the received packets received from the first point-to-point link within a window having a predetermined length;
    associate each received packet with a particular device of the plurality of devices, wherein the number of received packets associated with a respective particular device relative to the total number of received packets received from the first point-to-point link within the window corresponds to a respective packet issue rate of the respective particular device; and
    determine a highest packet issue rate of the respective packet issue rates.

28. The system as recited in claim 27, wherein each of the plurality of devices is configured to insert its local packets relative to forwarding its received packets onto its second point-to-point link at a device insertion rate that matches the highest packet issue rate determined by the allocation logic of that device.

29. The system as recited in claim 28, wherein each of the plurality of devices comprises priority logic operably coupled to the second interface and configured to arbitrate between the local packets and the received packets to transmit onto that device's second point-to-point link at the device insertion rate.

30. The system as recited in claim 27, wherein the allocation logic is configured to determine the highest packet issue rate dynamically.

31. The system as recited in claim 27, wherein the predetermined length of the window is correlative to a count of a predetermined number of received packets.

32. The system as recited in claim 27, wherein the predetermined length of the widow is correlative to a count of a predetermined number of received packets that are associated with a particular device.

33. The system as recited in claim 27, wherein the plurality of devices comprise input/output (I/O) devices, and the system comprises: a processing subsystem comprising a processor and a memory device; and a host bridge interconnecting the plurality of I/O devices to the processing subsystem, the host bridge being configured to manage communications between the plurality of I/O devices and the processor and the memory device.

* * * * *